United States Patent [19]

Ito et al.

[11] Patent Number: 5,671,167
[45] Date of Patent: Sep. 23, 1997

[54] METHOD AND APPARATUS FOR FORMING A MODEL FOR USE IN FINITE ELEMENT METHOD ANALYSIS

[75] Inventors: Nobutaka Ito; Kanako Murakami; Shuuichi Nakajima, all of Kawasaki, Japan

[73] Assignee: Fujitsu Limited, Kawasaki, Japan

[21] Appl. No.: 540,187

[22] Filed: Oct. 6, 1995

[30] Foreign Application Priority Data

Mar. 20, 1995 [JP] Japan .................................. 7-061319

[51] Int. Cl.$^6$ .................................................. G06F 17/50
[52] U.S. Cl. .................................................. 364/578
[58] Field of Search .......................... 364/578; 382/108, 382/154, 164, 165, 173, 190, 195, 199, 224

[56] References Cited

U.S. PATENT DOCUMENTS

| | | | |
|---|---|---|---|
| 4,989,166 | 1/1991 | Akasaka et al. | 364/578 |
| 5,125,038 | 6/1992 | Meshkat et al. | 364/578 |
| 5,315,537 | 5/1994 | Blacker | 364/578 |
| 5,416,729 | 5/1995 | Leon et al. | 364/578 |
| 5,553,009 | 9/1996 | Meshkat et al. | 364/578 |
| 5,579,249 | 11/1996 | Edwards | 364/578 |
| 5,581,489 | 12/1996 | Groothuis et al. | 364/578 |
| 5,604,893 | 2/1997 | Burnett et al. | 364/578 |

*Primary Examiner*—Vincent N. Trans
*Attorney, Agent, or Firm*—Staas & Halsey

[57] ABSTRACT

A method forms an analyzing model for use in finite element method analysis. The method includes the steps of (a) detecting faces of elements of the analyzing model which do not make contact with faces of other elements, based on information related to the analyzing model which is used in the finite element method analysis and describes a target unit which is to be analyzed, (b) grouping the faces of the elements detected in said step (a) into first groups for each of face numbers which are assigned with respect to each of the faces for the sake of convenience, (c) out of the elements having the faces included in each of the first groups obtained in said step (b), extracting elements having element numbers with the same increase number and grouping the extracted elements in second groups, where the element numbers are assigned with respect to each of the elements for the sake of convenience, (d) storing storage information with respect to the elements included in each of the second groups obtained in said step (c), where said storage information includes an element initial number, an element final number, an element number increase value and a face number included in the element, (e) specifying a range of the faces formed by the elements extracted in said step (c) with respect to said storage information, (f) newly forming solid finite elements in a space which is formed by the faces in the range specified by said step (e), (g) forming information which defines boundary conditions at faces outside the range specified by said step (e), and (h) changing conditions values depending on position coordinates of the faces in the definition of said boundary conditions of the faces.

28 Claims, 46 Drawing Sheets

FIG. 5

| FACE NUMBER | ANALYZING MODEL OF FIG.3 | ANALYZING MODEL OF FIG.4 |
|---|---|---|
| 1 | 1, 2, 3, 4 | 1, 2, 3 |
| 2 | 5, 6, 7, 8 | 4, 5, 6 |
| 3 | 1, 2, 6, 5 | 1, 2, 5, 4 |
| 4 | 2, 3, 7, 6 | 2, 3, 6, 5 |
| 5 | 3, 4, 8, 7 | 3, 1, 4, 6 |
| 6 | 4, 1, 5, 8 | — |

FIG. 15

```
                               DATE : 94/07/15  TIME : 15:17
                               PROJECT.LIBRARY.TYPE(MEMBER) : J3730.OFP256.BULKDATA(TOKKYO)
OFF
        ---+---1---+---2---+---3---+---4---+---5---+---6---+---7---+---8
001             -----------EXECUTIVE COMMANDS-----------
001      1 ---> ANALYSIS = SHEAT  ------ INDICATES ANALYZING CONTENT
001             FILE     = HEAT01
001             SAVE     = 26,39
001             -----------MODEL DATA BLOCK-----------
001      2 ---> *TITLE
001             NISA-II HEAT ANALYSIS OF    OUTPUT TITLE NAME
001      3 ---> *ELTYPE
004               1, 104, 1    ELEMENT TYPE NUMBER  1(TYPE ID NUMBER), 104(TYPE NUMBER), 1(ELEMENT ORDER NUMBER)
001   ELEMENT ID *RCTABLE    MATERIAL ID NUMBER  -- ELEMENT TYPE ID NUMBER DEFINED BY *ELTYPE
001   /NUMBER    *ELEMENT  / DEFINED BY MATID -- ID NUMBER DEFINED BY *RCTABLE
001   |           1   ,1    ,1     ,1     ,0 <--- CODE INDICATING ANISOTROPIC NATURE OF MATERIAL
003   |             1   ,2   ,5   ,4   ,11  ,12  ,15  ,14 ,   /0:ISOTROPIC  1:ANISOTROPIC\
001   |           2   ,1    ,1     ,1     ,0                  \2:STACKER                  /
003  4{            2   ,3   ,6   ,5   ,12  ,13  ,16  ,15 ,
001   |           3   ,1    ,1     ,1     ,0              ARRANGEMENT OF NODE NUMBERS
003   |             4   ,5   ,8   ,7   ,14  ,15  ,18  ,17 ,   SELATED TO ELEMENT
001   |           4   ,1    ,1     ,1     ,0
003   |             5   ,6   ,9   ,8   ,15  ,16  ,19  ,18 ,
001   |           5   ,2    ,1     ,2     ,0
003   \            15  ,16  ,19  ,18  ,25  ,26  ,29  ,28 ,
001             *NODES
001             1     , , , , 0.0      , 0.0      , 0.0      , <---- NODE NUMBER, . . ,X ,Y & Z COORDINATE VALUES
001             2     , , , , 1.0      , 0.0      , 0.0      ,
001             3     , , , , 2.00000  , 0.0      , 0.0      ,
001             4     , , , , 0.0      , 1.0      , 0.0      ,
001             5     , , , , 1.0      , 1.0      , 0.0      ,
001             6     , , , , 2.00000  , 1.0      , 0.0      ,
001             7     , , , , 0.0      , 2.00000  , 0.0      ,
001             8     , , , , 1.0      , 2.00000  , 0.0      ,
001             9     , , , , 2.00000  , 2.00000  , 0.0      ,
001             11    , , , , 0.0      , 0.0      , 1.0      ,
001       5 {   12    , , , , 1.0      , 0.0      , 1.0      ,
001             13    , , , , 2.00000  , 0.0      , 1.0      ,
001             14    , , , , 0.0      , 1.0      , 1.0      ,
001             15    , , , , 1.0      , 1.0      , 1.0      ,
001             16    , , , , 2.00000  , 1.0      , 1.0      ,
001             17    , , , , 0.0      , 2.00000  , 1.0      ,
001             18    , , , , 1.0      , 2.00000  , 1.0      ,
001             19    , , , , 2.00000  , 2.00000  , 1.0      ,
001             25    , , , , 1.0      , 1.0      , 2.0000   ,
001             26    , , , , 2.00000  , 1.0      , 2.0000   ,
001             28    , , , , 1.0      , 2.00000  , 2.0000   ,
001             29    , , , , 2.00000  , 2.00000  , 2.0000   ,
001   /X DIRECTION   *MATHEAT   / MATERIAL ID NUMBER
006   |THERMAL CONDUCTIVITY->KXX ,1 /  ,0  ,0  ,0000.00E+00
006   |SPECIFIC HEAT     ->C    ,1    ,0  ,0  ,0000.00E+00
006  6{ DENSITY          ->DENS ,1    ,0  ,0  ,0000.00E+00
006   |                    KXX  ,2    ,0  ,0  ,0000.00E+00
006   |                    C    ,2    ,0  ,0  ,0000.00E+00
006   \                    DENS ,2    ,0  ,0  ,0000.00E+00
001             ---------- ANALYSIS DATA BLOCK ----------
001      7 ---> *HEATCNTL
```

FIG. 16

```
OFF
        ----+----1----+----2----+----3----+----4----+----5----+----6----+----7----+----8
001      ┌ *SPTEMP
001    8 ┤ ** SET ID =      1          NODE TEMPERATURE CONDITION
001      └ ** NODE, TEMP, LASTND, NODEINC
001      ┌ *CONVBC
001    9 ┤ ** SET ID =      1          ELEMENT THERMAL CONDUCTION
001      │ ** NELID, LASTEL, INC, IDFACE   BOUNDARY CONDITION
001      └ **    H1, TEMP1, H2, TEMP2, H3, TEMP3, H4, TEMP4
001        -------------- ANALYSIS DATA BLOCK ----------------
001        **ENDDATA
```

```
                DATE : 94/07/15  TIME : 15:17
                PROJECT.LIBRARY.TYPE(MEMBER) : J3730.OFP256.BULKDATA(TOKKYOX)
OFF
       ---+---1---+---2---+---3---+---4---+---5---+---6---+---7---+---8
002 ELEMENT DATA =5
002 NODES DATA =22
002 BOUNDARY SURFACE (FACE NO.1) =4
002 BOUNDARY SURFACE (FACE NO.2) =4
002 BOUNDARY SURFACE (FACE NO.3) =3
002 BOUNDARY SURFACE (FACE NO.4) =3
002 BOUNDARY SURFACE (FACE NO.5) =3
002 BOUNDARY SURFACE (FACE NO.6) =3
002 ***   BOUNDARY ELEMENT OUTPUT  ***
004    START     COLOR      INCREASE   FACE
004    ELEMENT ID ELEMENT ID VALUE      NUMBER  KEY
008       1,        4,         1,         1,    -1
008       1,        3,         1,         2,    -1
008       1,        2,         1,         3,    -1
008       2,        4,         2,         4,    -1
008       3,        5,         1,         5,    -1
008       1,        5,         2,         6,    -1
002 MESSAGE ==><CADCD >R20.1.0 ---> FILE 1/0 REQUESTED
002 MESSAGE ==>.CADFIL ITO-TOKKYO-OUT1      IS FILED
002 MESSAGE ==><CADCD >R20.1.0 ---> FILE 1/0 REQUESTED
002 MESSAGE ==>.CADFIL ITO-TOKKYO-OUT1      IS FILED
002 MESSAGE ==><CADCD >R20.1.0 ---> FILE 1/0 REQUESTED
002 MESSAGE ==>.CADFIL ITO-TOKKYO-OUT1      IS FILED
```

→ INCRASE VALUE 1 & FACE NO. ALL 1 FOR
ELEMENT NOS. 1~4,
THIS 1 LINE IS WRITTEN NEXT TO *CONVBS
(FIG.10) & THERMAL CONDUCTIVITY &
TEMPERATURE ARE WRITTEN ON NEXT LINE

```
*CONVBC
1, 4, 1, 1, -1
     7.0  20.0
1, 3, 1, 2, -1
     7.0  20.0
```

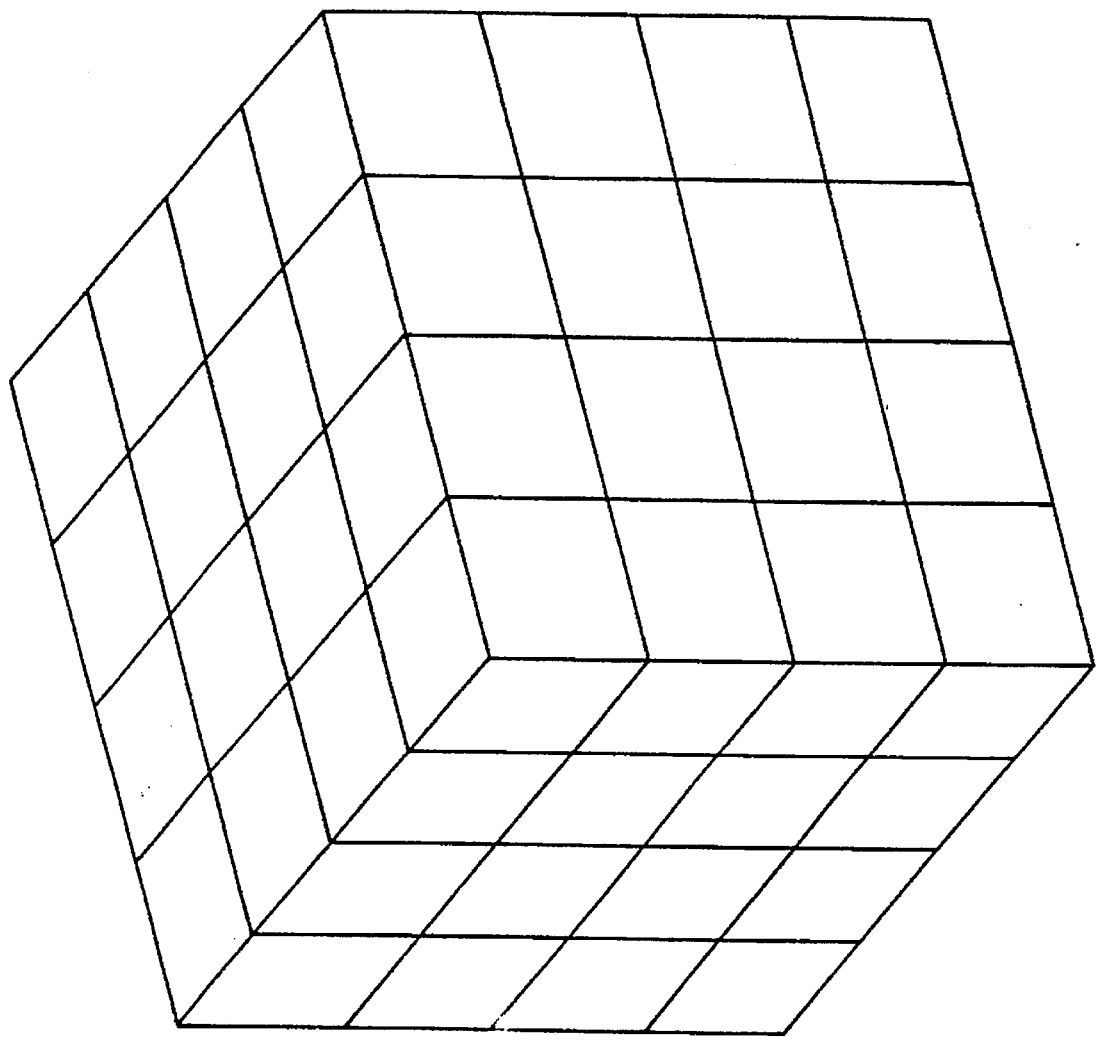
FIG. 19
RX = -60
RY = 0
RZ = 30
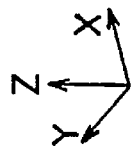

FIG. 20
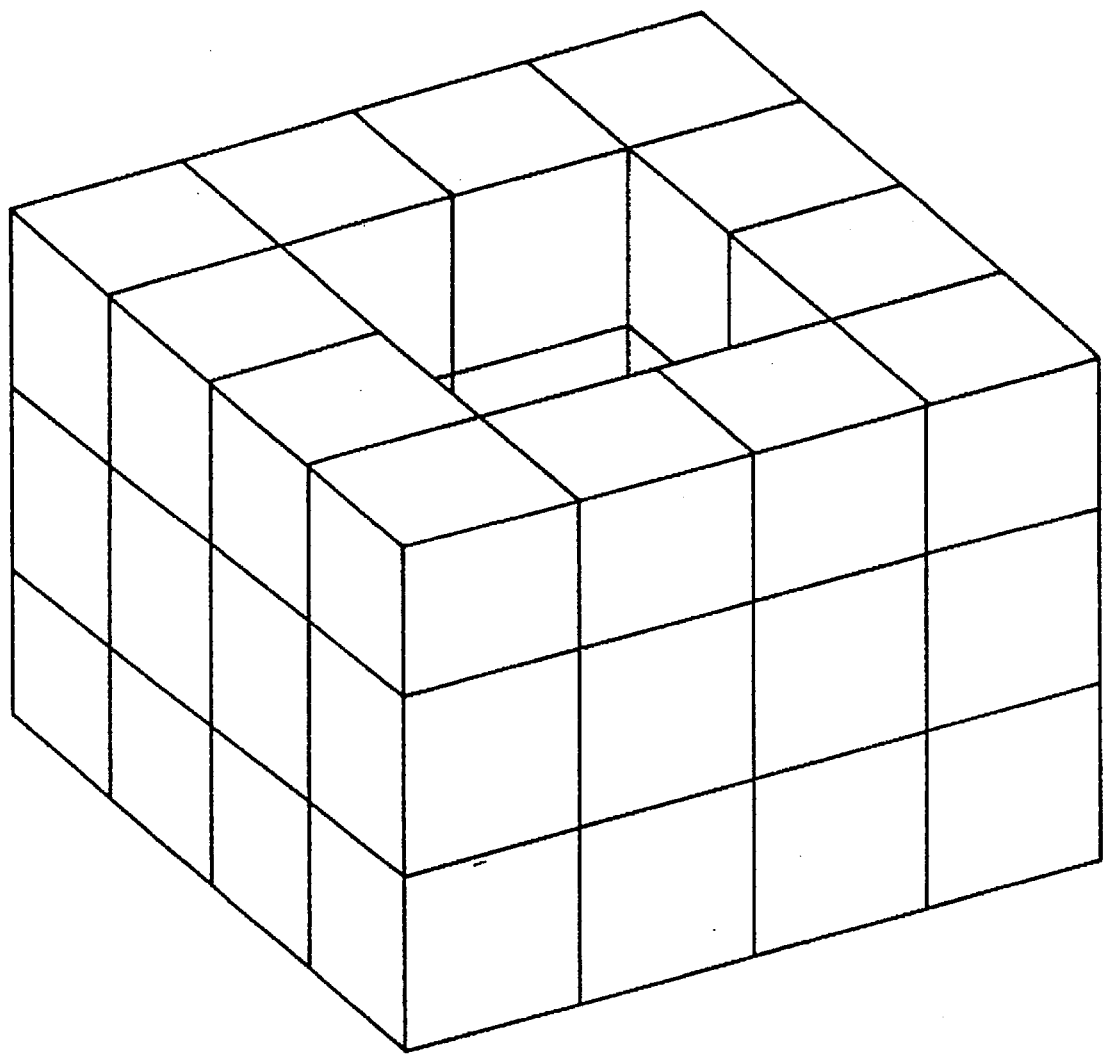
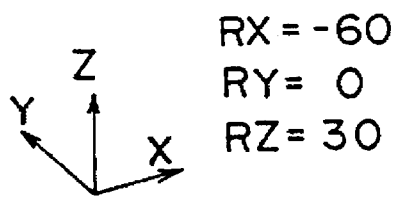

FIG. 21
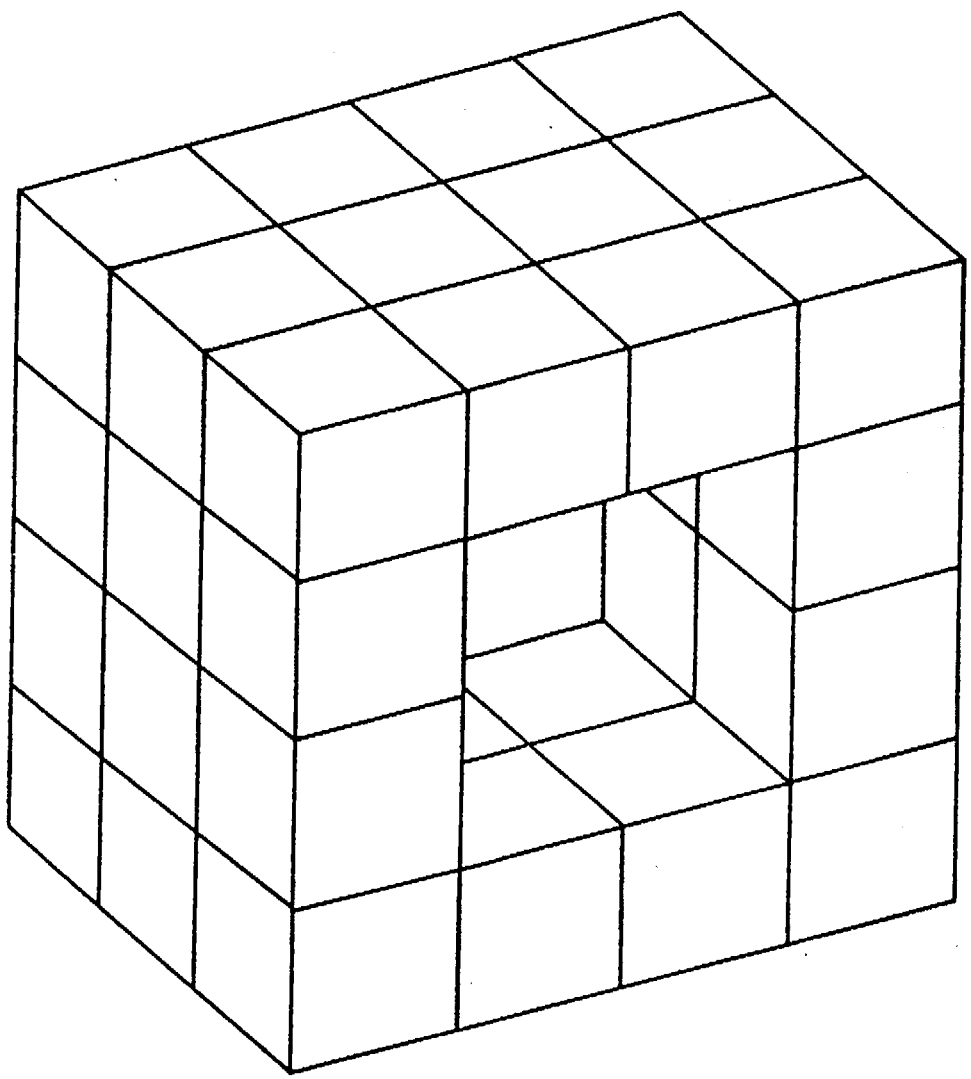
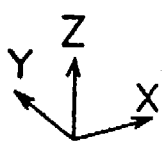
RX = -60
RY = 0
RZ = 30

FIG. 25

| ELEMENT NUMBER | INTERMEDIATE NODE |
|---|---|
| 1 0 1 1 | 1 1 1 7. 5 |
| 1 0 5 5 | 1 2 5 0. 0 |
| 2 0 2 3 | 2 0 0 2. 0 |
| 2 5 3 9 | 2 4 0 9. 5 |
| 3 2 3 2 | 3 0 0 1. 0 |
| . | . |
| . | . |
| . | . |

$\updownarrow$ R1

FIG. 28

| ELEMENT NUMBER | Xmin | Xmax | Ymin | Ymax | Zmin | Zmax |
|---|---|---|---|---|---|---|
| 1 2 3 | 0.0 | 10.0 | 0.0 | 10.0 | 0.0 | 10.0 |
| 3 4 4 | 10.5 | 21.5 | 0.0 | 10.0 | 0.0 | 10.0 |
| 1 2 3 3 | 0.0 | 10.0 | 0.0 | 10.0 | 10.0 | 20.0 |
| 2 4 5 5 | 10.5 | 21.5 | 0.0 | 10.0 | 20.0 | 30.0 |
| 3 6 8 8 | 40.0 | 50.0 | 0.0 | 10.0 | 30.0 | 40.0 |
| 3 4 5 5 | 20.5 | 28.0 | 0.0 | 10.0 | 30.0 | 40.0 |
| . | . | . | . | . | . | . |
| . | . | . | . | . | . | . |
| . | . | . | . | . | . | . |

FIG. 30

| ELEMENT NUMBER | X | Y | Z |
|---|---|---|---|
| 1 2 3 | 0.0 | 10.0 | 0.0 |
| 3 4 4 | 10.5 | 21.5 | 0.0 |
| 1 2 3 3 | 5.0 | 10.0 | 10.0 |
| 2 4 5 5 | 10.5 | 21.5 | 20.0 |
| 3 6 8 8 | 40.0 | 50.0 | 30.0 |
| 3 4 5 5 | 20.5 | 28.0 | 30.0 |
| . | . | . | . |
| . | . | . | . |
| . | . | . | . |

| | 1 | 2 | 3 | 4 | 5 | 6 | 7 | 14 |
|---|---|---|---|---|---|---|---|---|
| 1 | ELEMENT ID | | ELEMENT IDENTIFYING INDEX | | | NODE ID | NODE ID | NODE ID |
| 2 | | | | | | | | |
| LB | | | | | | | | |

NUMBER OF ELEMENTS: 1 to LB

FIG. 35

| FACE NO. | | | | | |
|---|---|---|---|---|---|
| 1 | 2 | 3 | 4 | 5 | 6 |
| NO. OF BOUNDARY SURFACES | NO. OF BOUNDARY SURFACES | NO. OF BOUNDARY SURFACES | NO. OF BOUNDARY SURFACES | NO. OF BOUNDARY SURFACES | NO. OF BOUNDARY SURFACES |

FIG. 36

| | 1 | 2 | 3 | 4 | |
|---|---|---|---|---|---|
| FACE NO. 1 | 1ST POSITION READ | 2ND POSITION | 3RD POSITION | 4TH POSITION | ⎫<br>⎬ SHAPE 1<br>⎭ |
| FACE NO. 6 | | | | | |
| | | | | | ⎫<br>⎬ SHAPE N<br>⎭ |

FIG. 38

| 1 | 2 | 3 | 4 | 5 | 6 | 7 | 8 | 9 | 10 |
|---|---|---|---|---|---|---|---|---|----|
| 11 | 12 | 13 | 14 | 15 | 16 | 17 | 18 | 19 | 20 |
| 21 | 22 | 23 | 24 | 25 | 26 | 27 | 28 | 29 | 30 |

FIG. 39

| | | COMPARING SEQUENCE | | | | | |
|---|---|---|---|---|---|---|---|
| | | 1 | 2 | 3 | 4 | 5 | 6 |
| FACE NO. | 1 | FACE NO. | FACE NO. | FACE NO. | FACE NO. | FACE NO. | FACE NO. |
| | ~ | ~ | ~ | ~ | ~ | ~ | ~ |
| | 6 | | | | | | |

FIG. 51

| ELEMENT ID | FACE NO. | NODE NO. | NODE NO. | NODE NO. | NODE NO. | GROUP NO. |
|---|---|---|---|---|---|---|
| 100 | 3 | 10 | 20 | 110 | 120 | |
| 1239 | 6 | 110 | 120 | 2251 | 2345 | |
| . | . | . | . | . | . | |
| . | . | . | . | . | . | |
| . | . | . | . | . | . | |

METHOD AND APPARATUS FOR FORMING A MODEL FOR USE IN FINITE ELEMENT METHOD ANALYSIS

BACKGROUND OF THE INVENTION

The present invention generally relates to methods and apparatuses for forming a model for use in finite element method analysis, and more particularly to a method and an apparatus which form a model for use in the finite element method analysis and are suited for forming a model that is used when carrying out the finite element method analysis to make a thermal design such as thermal conduction analysis related to electronic equipments including notebook type personal computers and portable terminal equipments, for example.

When developing a unit or module such as the electronic equipment, the finite element method analysis is often used to make a design inspection at an initial stage of the development. The finite element method analysis is often used particularly when inspecting the thermal design. Conventionally, the operation of finding a finite element and face number of a face of a complicated three-dimensionally shaped analysis model and assigning a thermal conductivity to each face was carried out manually by an operator.

In thermal conduction analysis, it is necessary to form a model of an internal space of the unit or module by a gas such as air in order to improve the accuracy of the analysis. However, when forming the model of the unit or module by three-dimensional computer aided design (CAD), the modeling of the space is usually not carried out beforehand. Instead, the operation of filling solid finite elements in the internal space of the unit or module is newly carried out manually at the finite element method analysis stage.

The operation of specifying a thermal conduction surface in the analyzing model and the operation of assigning the thermal conductivity to each face of the analysis model both greatly affect the accuracy of the analysis. Hence, it is essential to carry out the operation of manually inputting each thermal conduction surface and the thermal conductivity of each face one by one. For this reason, according to the conventional model forming method, there were problems in that an extremely long time is required to form the analyzing model, and that the possibility of an input error is high because the input is manually made by the operator.

On the other hand, in many cases, the structure of a certain unit or the like is formed by the three-dimensional CAD, and the analyzing model for use in the finite element method analysis is formed from this structure. In such cases, it is effective from the point of view of improving the accuracy of the analysis to define the internal space of the structure by the solid model of air. But the conventional model forming method only carries out modeling of a part having entity, and in order to define the internal space by a solid model of air, it is necessary to afterwards carry out the operation of adding solid finite elements to the part of the internal space. However, the operation of adding the solid finite elements with respect to the internal space is not only complicated, but an input error is easily introduced. Hence, it is desirable to initially form an input the finite elements with respect to the structure which includes the internal space. As a result, the amount of data processing required at the initial stage becomes extremely large and complicated, and the input error is easily introduced because of the large amount of information that is input. Consequently, there was a problem in that a large number of errors are easily generated when forming the analyzing model.

SUMMARY OF THE INVENTION

Accordingly, it is a general object of the present invention to provide a novel and useful method and apparatus for forming a model for use in finite element method analysis, in which the problems described above are eliminated.

Another and more specific object of the present invention is to provide a method and an apparatus for forming a model for use in finite element method analysis, which automatically extract a face of an element which does not share a face with another element based on information of an analyzing model that is used for the finite element method analysis, and accurately generates data related to boundary conditions such as uniformly distributed pressure to the face of the analyzing model, heat radiation conditions from the face of the analyzing model and heat absorbing conditions, so that the time required to form the analyzing model is reduced and the accuracy of the analysis is improved by preventing errors from being generated when forming the analyzing model.

Still another object of the present invention is to provide a method of forming an analyzing model for use in finite element method analysis, comprising the steps of (a) detecting faces of elements of the analyzing model which do not make contact with faces of other elements, based on information related to the analyzing model which is used in the finite element method analysis and describes a target unit which is to be analyzed, (b) grouping the faces of the elements detected in said step (a) into first groups for each of face numbers which are assigned with respect to each of the faces for the sake of convenience, (c) out of the elements having the faces included in each of the first groups obtained in said step (b), extracting elements having element numbers with the same increase number and grouping the extracted elements in second groups, where the element numbers are assigned with respect to each of the elements for the sake of convenience, (d) storing storage information with respect to the elements included in each of the second groups obtained in said step (c), where said storage information includes an element initial number, an element final number, an element number increase value and a face number included in the element, (e) specifying a range of the faces formed by the elements extracted in said step (c) with respect to said storage information, (f) newly forming solid finite elements in a space which is formed by the faces in the range specified by said step (e), (g) forming information which defines boundary conditions at faces outside the range specified by said step (e), and (h) changing conditions values depending on position coordinates of the faces in the definition of said boundary conditions of the faces. According to the method of the present invention, it is possible to directly input the analyzing model for use in the finite element method analysis and automatically detect the faces of the elements which do not make contact with the faces of other elements, out of the elements forming the analyzing model. For this reason, it is possible to automatically generate the input data of the boundary conditions within a short time, where the boundary conditions include uniform pressure to the faces of the analyzing model, heat radiation from the faces of the analyzing model, and heat absorbing conditions. In addition, it is possible to reduce the amount of input data of the boundary conditions in the finite element method analysis, because the detected faces of the elements are grouped for each of the face numbers, the elements having the grouped faces are further grouped into the elements having the element numbers with the same increase value, and further, the element initial number, element final number, element number increase value and face number of element are stored as storage information for each of the groups with the same increase number.

A further object of the present invention is to provide an apparatus which forms an analyzing model for use in finite element method analysis, comprising first means for detecting faces of elements of the analyzing model which do not make contact with faces of other elements, based on information related to the analyzing model which is used in the finite element method analysis and describes a target unit which is to be analyzed, second means for grouping the faces of the elements detected in said first means into first groups for each of face numbers which are assigned with respect to each of the faces for the sake of convenience, third means for extracting elements having element numbers with the same increase number and grouping the extracted elements in second groups, out of the elements having the faces included in each of the first groups obtained in said second means, where the element numbers are assigned with respect to each of the elements for the sake of convenience, fourth means for storing storage information with respect to the elements included in each of the second groups obtained in said third means, where said storage information includes an element initial number, an element final number, an element number increase value and a face number included in the element, fifth means for specifying a range of the faces formed by the elements extracted in said third means with respect to said storage information, sixth means for newly forming solid finite elements in a space which is formed by the faces in the range specified by said fifth means, seventh means for forming information which defines boundary conditions at faces outside the range specified by said fifth means, and eighth means for changing conditions values depending on position coordinates of the faces in the definition of said boundary conditions of the faces. According to the apparatus of the present invention, it is possible to directly input the analyzing model for use in the finite element method analysis and automatically detect the faces of the elements which do not make contact with the faces of other elements, out of the elements forming the analyzing model. For this reason, it is possible to automatically generate the input data of the boundary conditions within a short time, where the boundary conditions include uniform pressure to the faces of the analyzing model, heat radiation from the faces of the analyzing model, and heat absorbing conditions. In addition, it is possible to reduce the amount of input data of the boundary conditions in the finite element method analysis, because the detected faces of the elements are grouped for each of the face numbers, the elements having the grouped faces are further grouped into the elements having the element numbers with the same increase value, and further, the element initial number, element final number, element number increase value and face number of element are stored as storage information for each of the groups with the same increase number.

Other objects and further features of the present invention will be apparent from the following detailed description when read in conjunction with the accompanying drawings.

BRIEF DESCRIPTION OF THE DRAWINGS

FIG. 5 is a diagram showing the relationship of a face number and a node number for the analyzing models shown in FIGS. 3 and 4;

FIGS. 15 and 16 respectively are diagrams showing data related to the model for use in the finite element method analysis and processed by the embodiment;

FIG. 18 is a diagram showing output data describing elements and face numbers extracted by the embodiment;

FIG. 19 is a perspective view showing an analyzing model having an internal space;

FIGS. 20 and 21 respectively are perspective views showing the inside of the analyzing model shown in FIG. 19 by cutting the analyzing model at different parts;

FIG. 25 is a diagram showing a dummy intermediate node table;

FIG. 28 is a diagram showing a coordinate range table;

FIG. 30 is a diagram showing a starting coordinate value table;

FIG. 35 is a diagram showing a one-dimensional array MB;

FIG. 36 is a diagram showing a two-dimensional array IC;

FIG. 38 is a diagram showing an element forming sequence;

FIG. 39 s a diagram showing a two-dimensional array MAC;

FIG. 51 is a diagram showing a table which is made up of read faces and nodes forming the faces;

DESCRIPTION OF THE PREFERRED EMBODIMENTS

Figure 1:
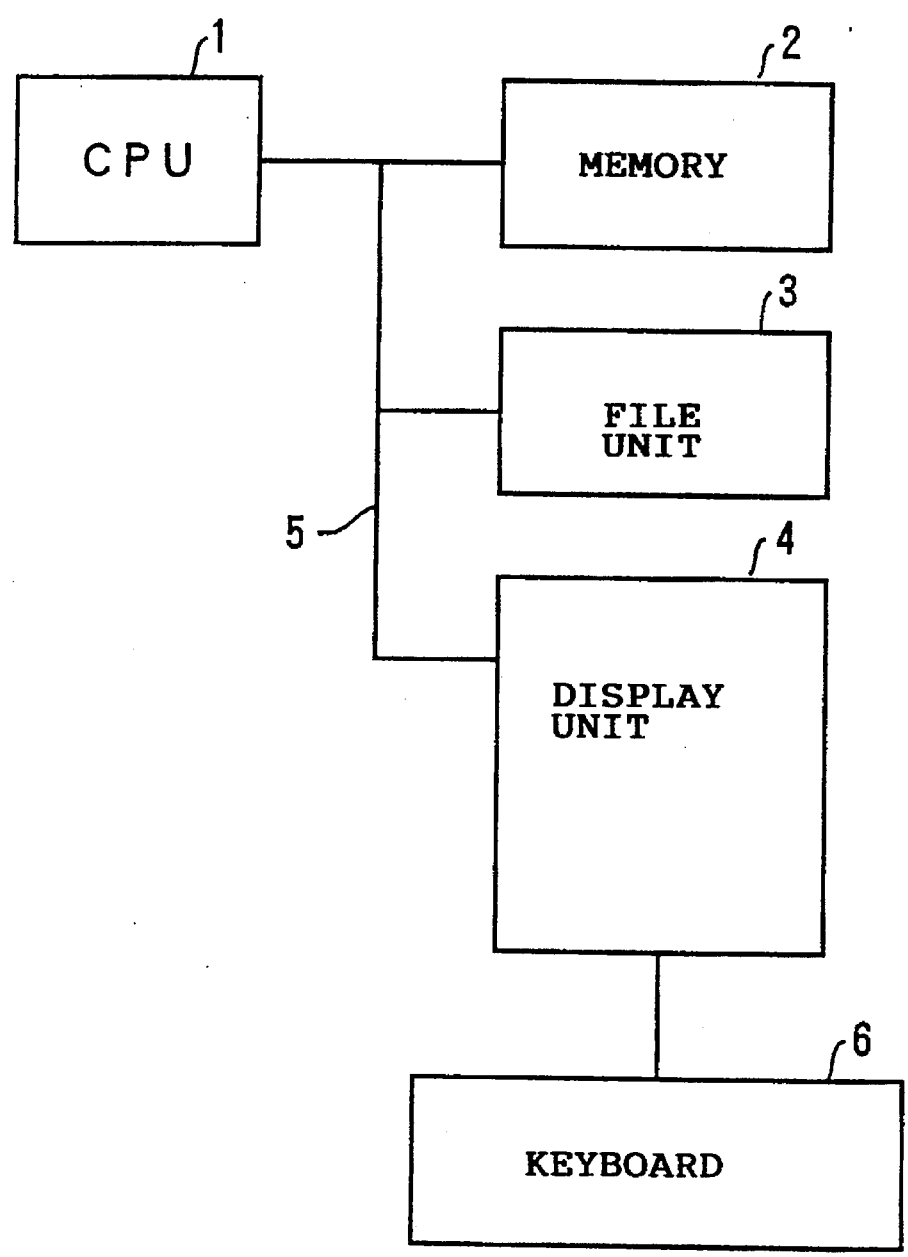
FIG. 1 is a system block diagram showing an embodiment of an apparatus for forming a model for use in finite element method analysis according to the present invention.

FIG. 1 is a system block diagram showing an embodiment of an apparatus for forming a model for use in finite element method analysis according to the present invention. The apparatus shown in FIG. 1 generally includes a central processing unit (CPU) 1, a memory 2, a file unit 3, and a display unit 4 which are coupled via a bus 5. A key board 6 and a mouse and a mouse pad (both not shown) are coupled to the display unit 4.

The CPU 1 controls the operation of the entire apparatus. The memory 2 stores programs which are executed by the CPU 1, data which are processed by the CPU 1, and the like. The file unit 3 stores in a file format information related to an analyzing model which indicates each unit or module and is used for the finite element method analysis. The display unit 4 displays the analyzing model, input information or the like received from the keyboard 6 and the mouse, and a message or the like with respect to the operator.

Figure 2:
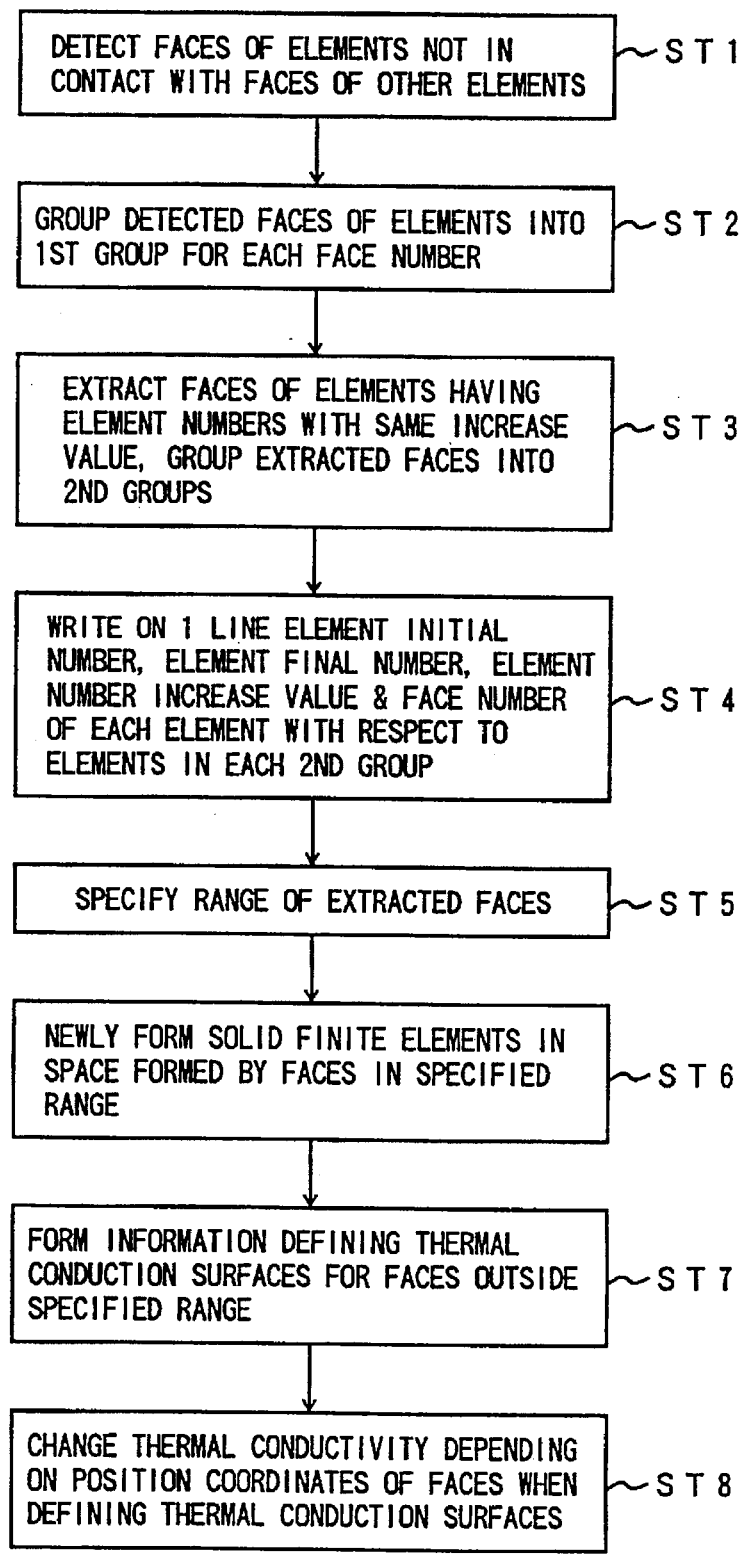
FIG. 2 is a flow chart for explaining a basic operation of a central processing unit.

FIG. 2 is a flow chart for explaining a basic operation of the CPU 1, and corresponds to the operation of an embodiment of a method for forming a model for use in finite element method analysis according to the present invention. In FIG. 2, out of the elements of the analyzing model, a step ST1 detects faces of the elements which do not make contact with faces of other elements based on information which is related to the analyzing model which is used for the finite element method analysis and indicates the unit to be analyzed (hereinafter simply referred to as a "target unit"). This information is stored in the file unit 3. The step ST1 is carried out to make boundary conditions and the like which are used in the finite element method analysis. The information related to the analyzing model may be formed by the CPU 1 using three-dimensional CAD or the like.

Figure 3:
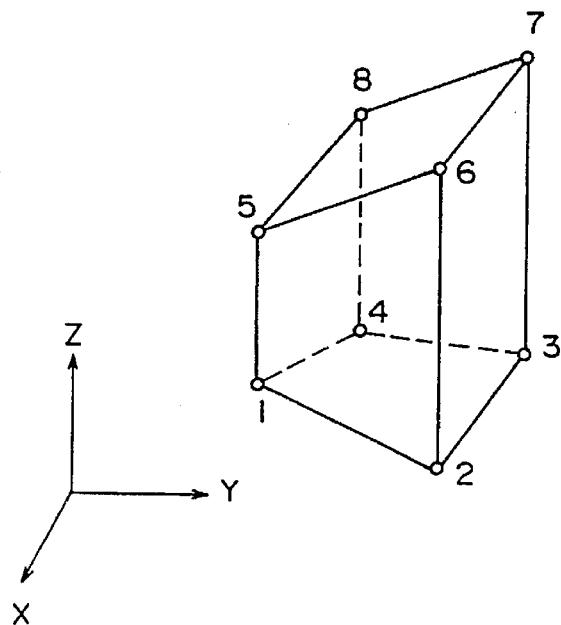
FIG. 3 is a perspective view showing one analyzing model.
Figure 4:
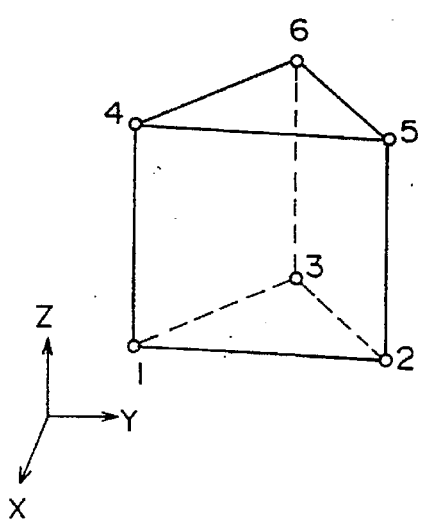
FIG. 4 is a perspective view showing another analyzing model.

FIG. 3 is a perspective view showing an element of one analyzing model, and FIG. 4 is a perspective view showing an element of another analyzing model. FIG. 3 shows a case where the element of the analyzing model is a 6-face polygon, and nodes of the finite element of the solid have node numbers "1" through "8". On the other hand, FIG. 4 shows a case where the element of the analyzing model is a 5-face polygon, and nodes of the finite element of the solid have node numbers "1" through "6". The node number is a number assigned to each of the nodes for the sake of convenience. In FIGS. 3 and 4, circular marks indicate the nodes of the finite elements.

A step ST2 shown in FIG. 2 groups the faces of the elements detected in the step ST1 into first groups for each of face numbers. The face number is a number assigned to each of the faces for the sake of convenience.

FIG. 5 is a diagram showing the relationship of the face numbers and the node numbers for the analyzing models shown in FIGS. 3 and 4. In FIG. 5, the face of the element indicated by the face number "1" of the analyzing model shown in FIG. 3, for example, is formed by the nodes indicated by the node numbers "1", "2", "3" and "4". In addition, the face of the element indicated by the face number "4" of the analyzing model shown in FIG. 4, for example, is formed by the nodes indicated by the node numbers "2", "3", "6" and "5". A sequence in which the nodes forming the element are registered is determined so that a normal direction with respect to the face formed by the nodes which are retrieved when the nodes are retrieved in a certain direction (counterclockwise in this particular case) is directed towards the outside of the element. In the case of the analyzing model shown in FIG. 3, the normal direction is directed towards the inside of the element for the face number "1" in FIG. 5, and thus, it is desirable to change the registering sequence from the node numbers "1", "2", "3" and "4" to the node numbers "1", "4", "3" and "2".

Out of the faces of the elements included in each of the first groups obtained in the step ST2 shown in FIG. 2, a step ST3 extracts the faces of the elements having element numbers with the same increase value, and groups the extracted faces into second groups. The element number is a number which is assigned to each of the elements of the analyzing model for the sake of convenience.

With respect to the elements included in each of the second groups obtained in the step ST3, a step ST4 writes on 1 line an element initial number, an element final number, an element number increase value, and a face number of each element.

In order to process a specific part of the faces of the elements extracted in the step ST3, a step ST5 specifies a range of the coordinates to be separated.

A step ST6 newly forms solid finite elements in a space which is formed by the faces in the range specified by the step ST5.

In other words, the steps ST5 and ST6 are carried out so that, out of the group of faces not making contact with the faces of other elements, each face included in the group is distinguished between the inside and the outside of the shape of the target unit. With respect to the faces on the inside of the shape of the target unit, finite elements are newly filled into a space surrounded by these faces. For example, the internal space of the shape of the target unit is filled by finite elements having the properties of air.

A step ST7 forms information which defines thermal conduction surfaces that are boundary conditions of the analysis using faces outside the range specified by the step ST5. In other words, the faces making no contact with the faces of other elements and making contact with the space are detected with respect to the extracted elements, and the analyzing conditions such as the heat radiation are input to the detected faces. As a result, out of the group of faces making no contact with the faces of other elements, the range of at least one of the coordinate space, element number, node number and the like is specified with respect to the external surface, and bulk data for defining at least one of the boundary conditions including the thermal conduction surface, initial temperature condition, final temperature condition, restricting condition, pressure condition and the like are formed.

When defining the thermal conduction surface, a step ST8 changes the thermal conductivity which is the condition value, depending on the position coordinates of the faces. In other words, the condition values are changed depending on the face positions with respect to the analyzing conditions to the faces making contact with the space.

Therefore, a face of the element which does not share a face with another element is automatically extracted based on the information of the analyzing model that is used for the finite element method analysis, and data related to the boundary conditions such as uniformly distributed pressure to the face of the analyzing model, heat radiation conditions from the face of the analyzing model and heat absorbing conditions are accurately generated, so that the time required to form the analyzing model is reduced and the accuracy of the analysis is improved by preventing errors from being generated when forming the analyzing model.

Next, a more detailed description will be given of this embodiment of the method, by referring to FIGS. 6 through 10. FIGS. 6 through 14 respectively are flow charts for explaining this embodiment of the method.

Figure 6:
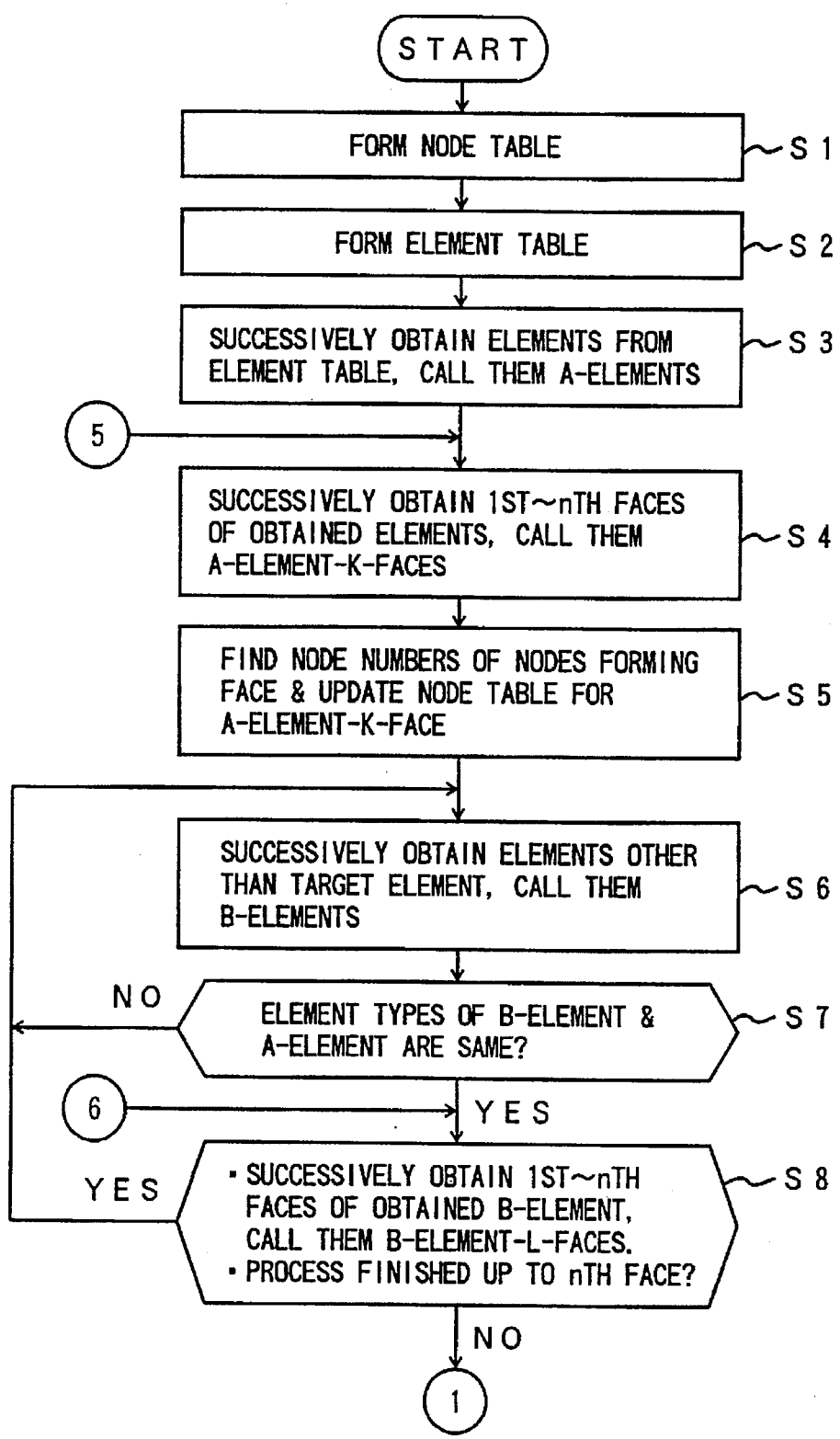
FIGS. 6 and 7 respectively are flow charts for explaining an operation corresponding to a step ST1 shown in FIG. 2.
Figure 7:
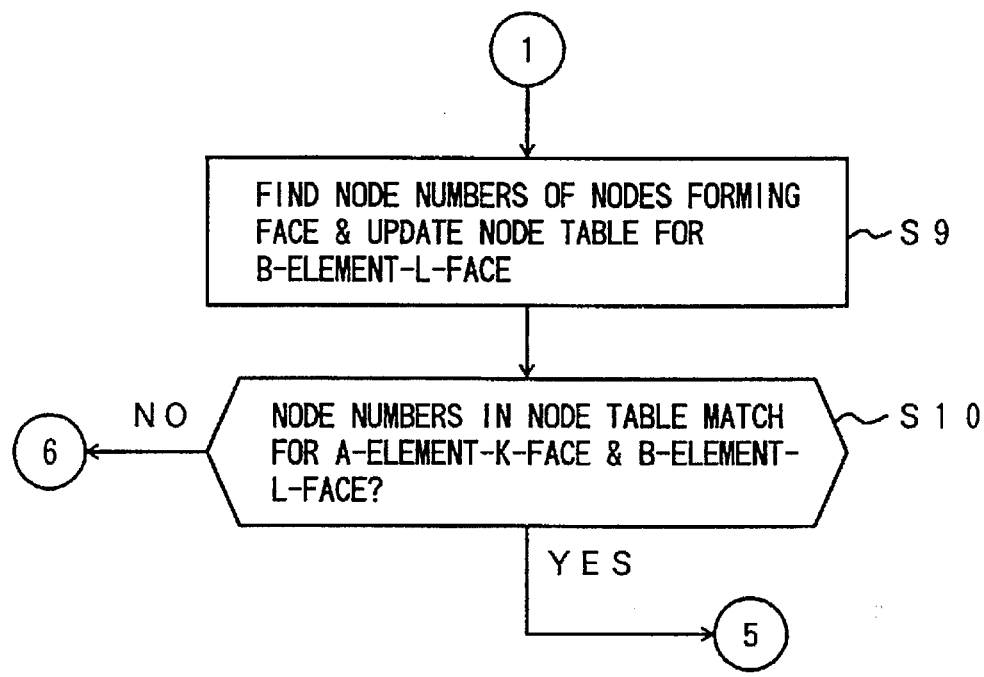

FIGS. 6 and 7 are flow charts for explaining the operation corresponding to the step ST1 shown in FIG. 2. In FIG. 6, a step S1 forms a node table indicating the node numbers and the coordinate values of the analyzing model, based on information which is stored in the file unit 3 and is related to the analyzing model that is used for the finite element method analysis with respect to the target unit. This node table and various other tables which will be described later are stored in the memory 2 shown in FIG. 1. The node number is a number assigned with respect to each of the nodes of the elements for the sake of convenience. A step S2 forms an element table indicating the element numbers of the analyzing model, element types and the nodes forming the elements. The element type indicates the kind of element. A step S3 successively obtains the elements from the element table, and defines the obtained elements as A-elements for the sake of convenience.

A step S4 successively obtains first through nth faces of the obtained elements, and defines the obtained faces as A-element-K-faces for the sake of convenience. In this case, n=6 when the element has 8 nodes as shown in FIG. 3, and n=5 when the element has 6 nodes as shown in FIG. 4. A step S5 finds the node numbers of the nodes forming the A-element-K-face from the element table, and updates the node table for the A-element-K-face. One example of the relationship of the faces forming the element and the node numbers is shown in FIG. 5. A step S6 successively obtains elements other than the target elements, and defines the obtained elements as B-elements for the sake of convenience. The element number, element type, face number and the like of each B-element are checked in a step S7 and the subsequent steps. When the checking of all of the B-elements other than the target elements ends and no faces formed by the same nodes exist between the A-elements and the B-elements, the A-element-K-faces are boundary surfaces. Hence, the element number, the element type and the face number are stored in a boundary surface table for each of the boundary surfaces.

A step S7 compares the element type of the obtained B-element and the element type of the A-element, and decides whether or not the element types are the same. If the decision result in the step S7 is YES, the process advances to a step S8. On the other hand, the process returns to the step S8 if the decision result in the step S7 is NO. The step S8 successively obtains the first through nth faces of the obtained B-element, and carries out a process to define the obtained surfaces as B-element-L-faces for the sake of convenience. The step S8 also decides whether or not this process is finished up to the nth face. If the decision result in the step S8 is YES, the process returns to the step S6. But if the decision result in the step S8 is NO, the process advances to a step S9 shown in FIG. 7.

The step S9 shown in FIG. 7 finds the node numbers of the nodes forming the B-element-L-face from the element table, and updates the node table with respect to the B-element-L-face. A step S10 compares the node numbers which are stored in the node table with respect to the A-element-K-faces, and the node numbers which are stored in the node table with respect to the B-element-L-faces, and decides whether or not the node numbers are the same. If the decision result in the step S10 is YES, the B-element-L-face is not a boundary surface, and the process returns to the step S4 shown in FIG. 6. On the other hand, if the decision result in the step S10 is NO, the process returns to the step S8 shown in FIG. 6 so as to obtain the next face or element.

Figure 8:
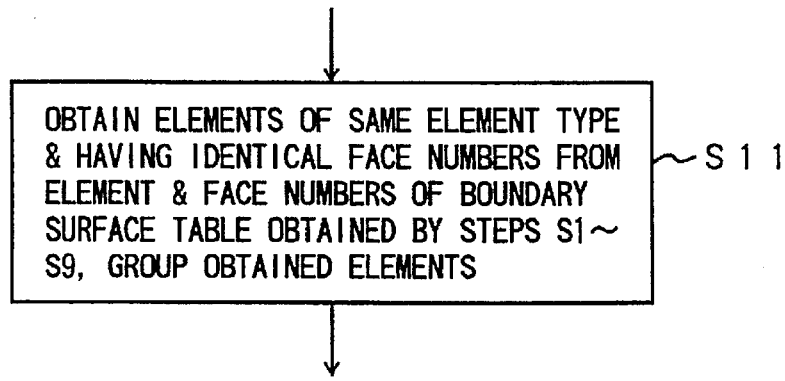
FIG. 8 is a flow chart for explaining an operating on corresponding to a step ST2 shown in FIG. 2.

FIG. 8 is a flow chart for explaining the operation corresponding to the step ST2 shown in FIG. 2. In FIG. 8, a step S11 obtains elements of the same element type and having the identical face numbers from the element numbers and the face numbers of the boundary surface table which is obtained by the steps S1 through S9 shown in FIGS. 6 and 7, and groups the obtained elements into a first group.

Figure 9:
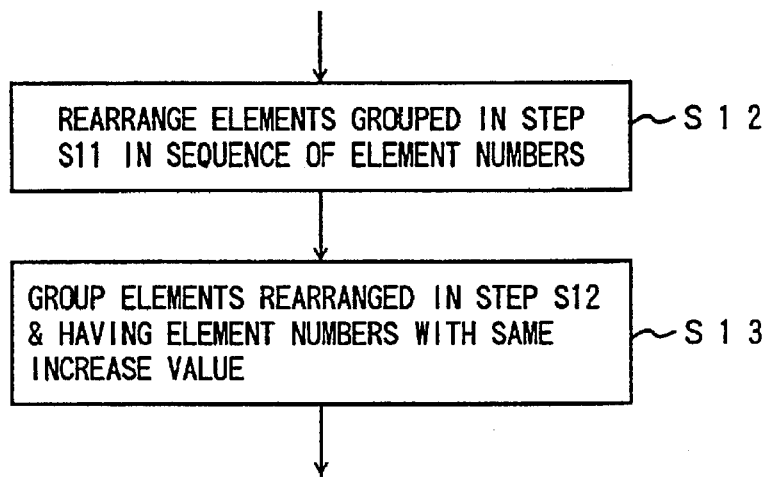
FIG. 9 is a flow chart for explaining an operation corresponding to a step ST3 shown in FIG. 2.

FIG. 9 is a flow chart for explaining the operation corresponding to the step ST3 shown in FIG. 2. In FIG. 9, a step S12 rearranges the elements of the faces included in each first group in the sequence of the element numbers. In addition, out of the elements which are rearranged in the sequence of the element numbers, a step S13 extracts the elements having the element numbers with the same increase value and which are sequential, and groups the extracted elements into second groups.

Figure 10:
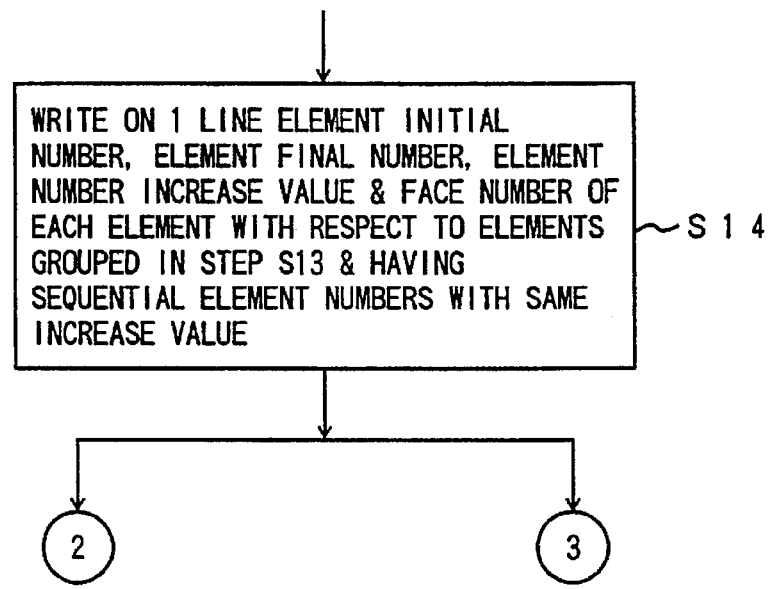
FIG. 10 is a flow chart for explaining an operation corresponding to a step ST4 shown in FIG. 2.

FIG. 10 is a flow chart for explaining the operation corresponding to the step ST4 shown in FIG. 2. In FIG. 10, a step S14 writes in the form of 1 line the element initial number, the element final number, the element number increase value, and the face number of each element with respect to the elements included in each of the second groups obtained in the step S13.

Figure 11:
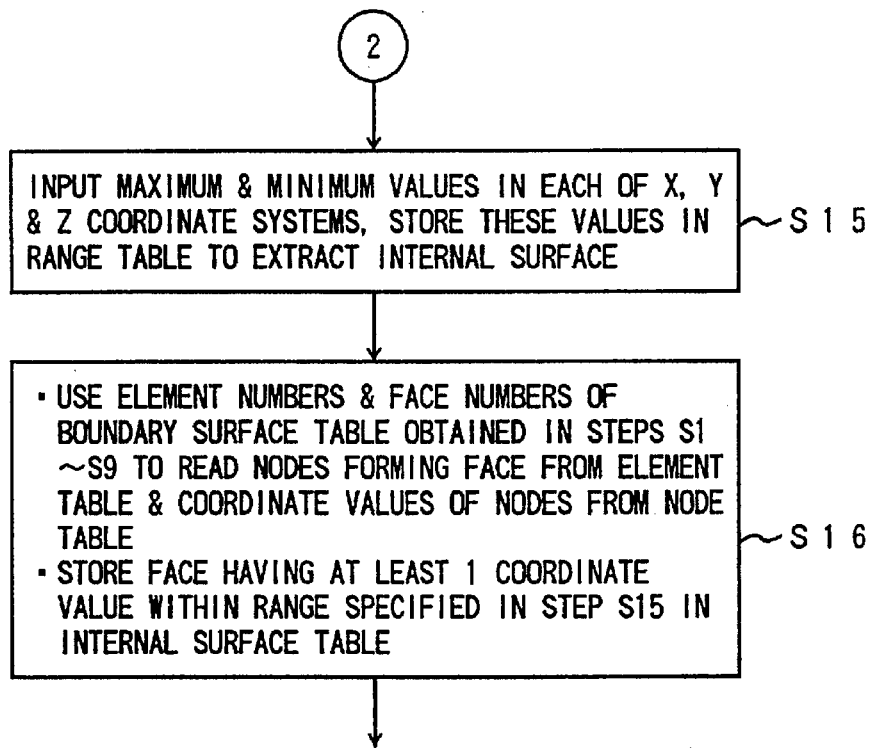
FIG. 11 is a flow chart for explaining an operation corresponding to a step ST5 shown in FIG. 2.

FIG. 11 is a flow chart for explaining the operation corresponding to the step ST5 shown in FIG. 2. After carrying out the step S14, a step S15 shown in FIG. 11 inputs maximum and minimum values in each of the X, Y and Z coordinate systems from the keyboard 6 and stores the maximum and minimum values in a range table, so as to extract the internal surface of the analyzing model from the information related to the analyzing model. A step S16 uses the element numbers and the face numbers of the boundary surface table which is obtained by the steps S1 through S9, so as to read the nodes forming the face from the element table and to read the coordinate values of the nodes from the node table. The face having at least one read coordinate value that falls within the range specified by the step S15 is obtained and stored in an internal surface table.

Figure 12:
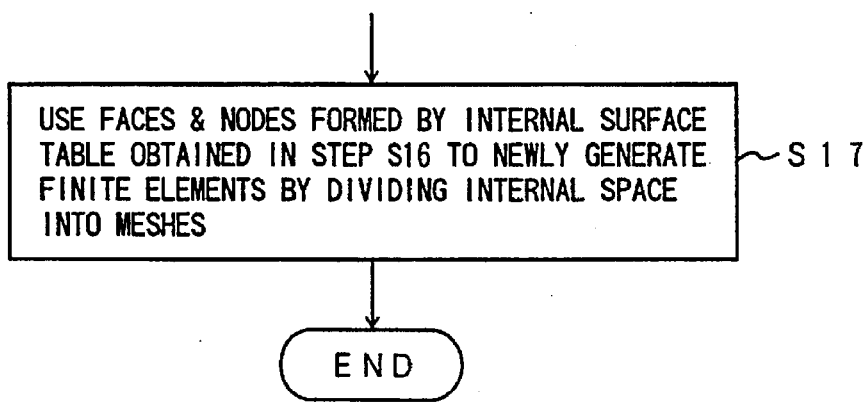
FIG. 12 is a flow chart for explaining an operation corresponding to a step ST6 shown in FIG. 2.

FIG. 12 is a flow chart for explaining the operation corresponding to the step ST8 shown in FIG. 2. In FIG. 12, a step S17 uses the faces and the nodes formed by the internal surface table which is obtained in the step S16, and newly generates finite elements by dividing the internal space into meshes utilizing an inter-active system of a CAD unit or an automatic mesh generating technique.

Figure 13:
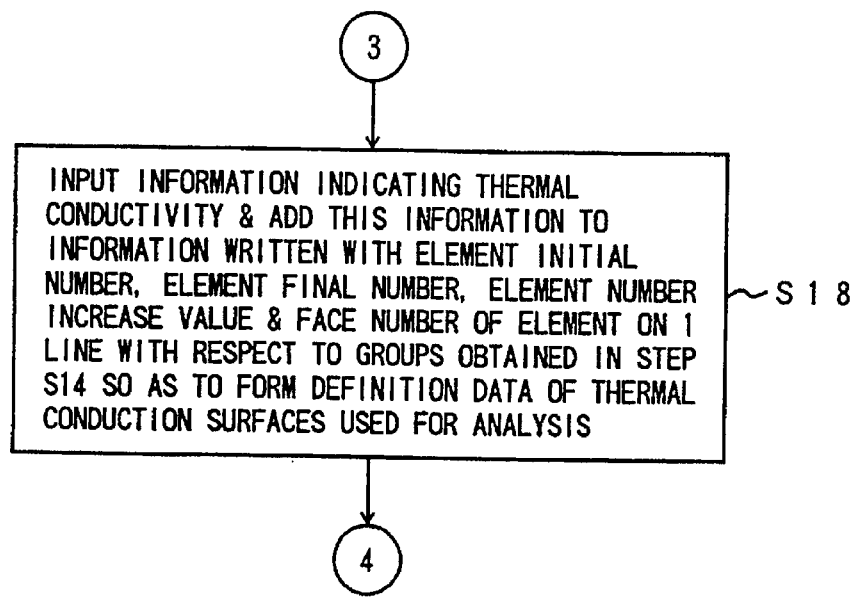
FIG. 13 is a flow chart for explaining an operation corresponding to a step ST7 shown in FIG. 2.

FIG. 13 is a flow chart for explaining the operation corresponding to the step ST7 shown in FIG. 2. After carrying out the step S14, a step S18 shown in FIG. 13 inputs information indicating the thermal conductivity and adds this information to the information which is written with the element initial number, the element final number, the element number increase value, and the face number of the element on 1 line with respect to the elements which are included in each of the second groups, so as to form definition data of thermal conduction surfaces that are used for the analysis. The information indicating the thermal conductivity may be input from the keyboard 6 or input by an input means for inputting thermal conductivity information which is the executed result of a fluid analyzing program.

Figure 14:
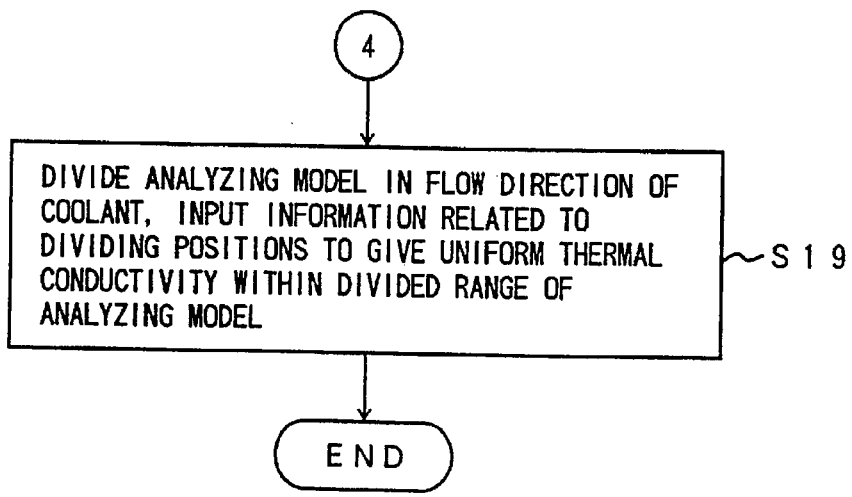
FIG. 14 is a flow chart for explaining an operation corresponding to a step ST8 shown in FIG. 2.

FIG. 14 is a flow chart for explaining the operation corresponding to the step ST8 shown in FIG. 2. In order to change the thermal conductivity of the thermal conduction surface to be given to the analyzing data in the definition data that are formed by the step S18 depending on the change in the thermal conductivity of the surface due to the flow direction of a coolant such as air, for example, a step S19 shown in FIG. 14 divides the analyzing model in the flow direction of the coolant. In addition, in order to give a uniform thermal conductivity within the divided range of the analyzing model, information related to the dividing positions is input from the keyboard 6, for example. Furthermore, it is possible to input the thermal conductivity information based on the thermal conductivity information which is the execution result of the fluid analyzing program.

FIGS. 15 and 16 respectively are diagrams showing data related to the model for use in the finite element method analysis and processed by this embodiment. In FIGS. 15 and 16, there are shown an analyzing content 1, a title 2, an element type 3, element data 4, node data 5, material data 6, heat generation data 7, node temperature condition data 8, and thermal conduction boundary condition data.

Figure 17:
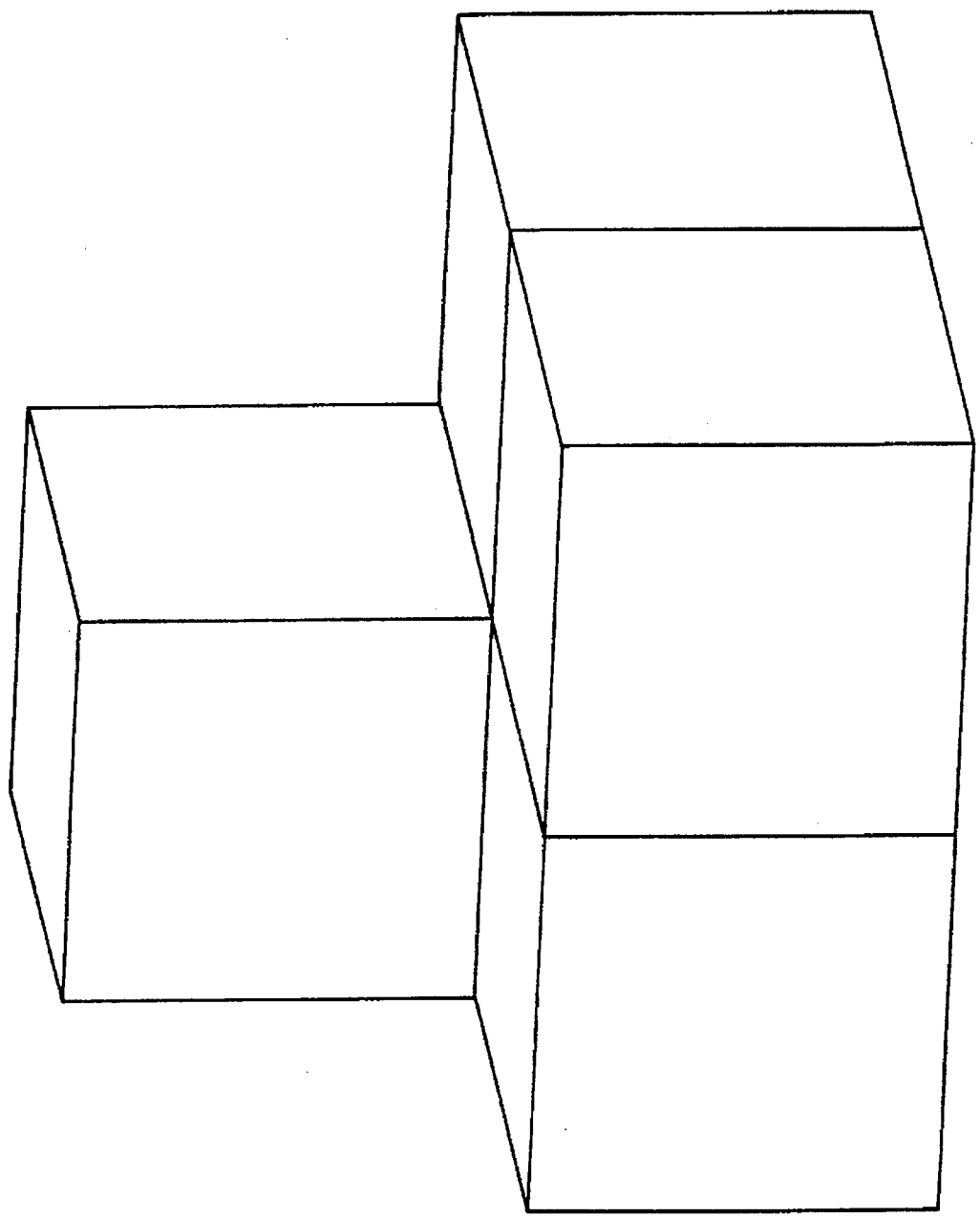
FIG. 17 is a perspective view showing an analyzing model described by the data shown in FIGS. 15 and 16.

FIG. 17 is a perspective view showing an analyzing model described by the data shown in FIGS. 15 and 16.

FIG. 18 is a diagram showing output data describing the elements and the face numbers which are extracted by this embodiment.

FIG. 19 is a perspective view showing an analyzing model having an internal space. In addition, FIGS. 20 and 21 respectively are perspective views showing the inside of the analyzing model shown in FIG. 19 by cutting the analyzing model at different parts.

Figure 22:
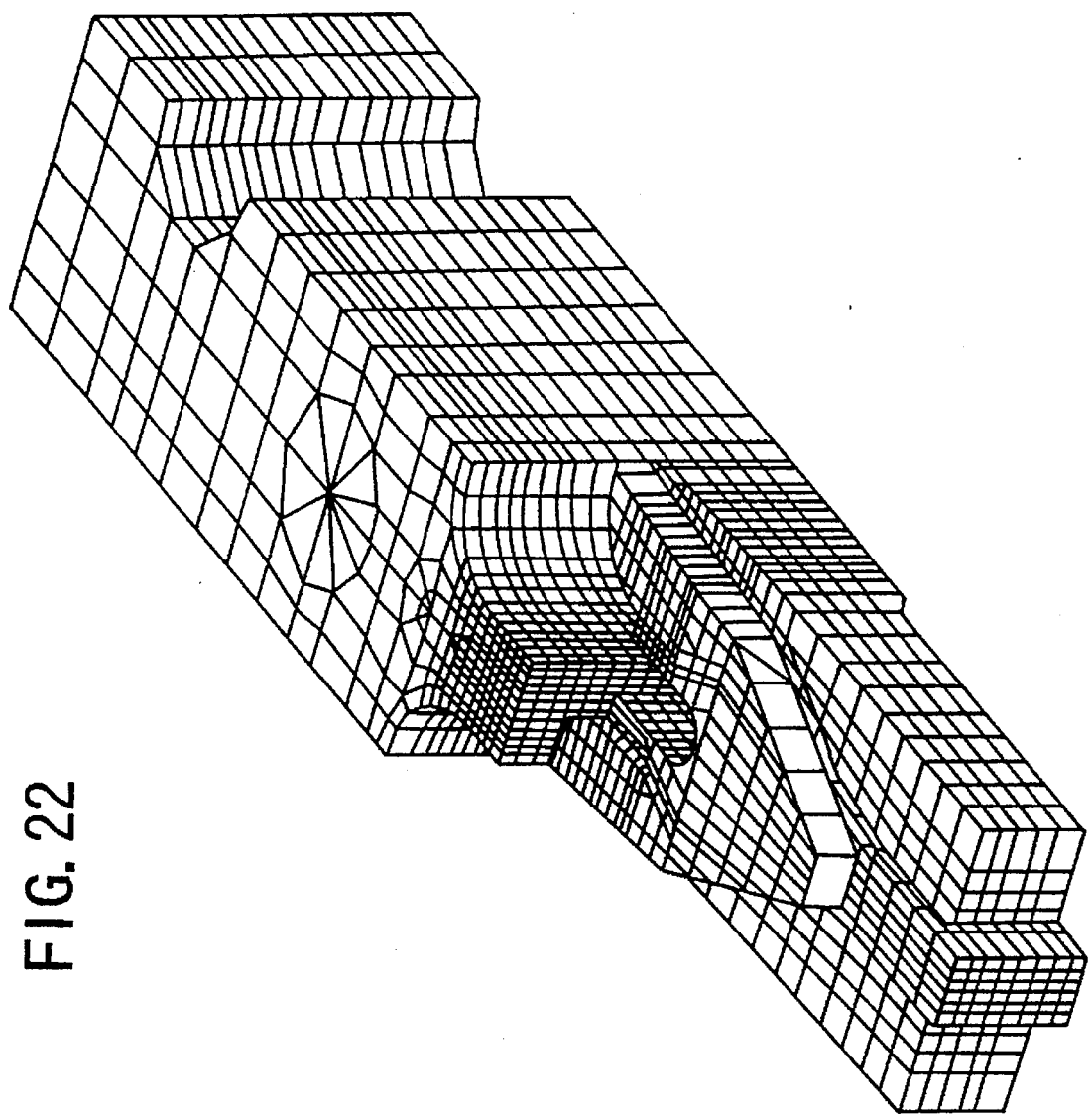
FIG. 22 is a perspective view showing a model of an actual product.

FIG. 22 is a perspective view showing a model of an actual product.

Next, a description will be given of various embodiments of the process which detects the boundary elements in the step ST1 shown in FIG. 2 or the steps S1 through S10 shown in FIGS. 3 and 4, that is, the process which detects the boundary surface.

Figure 23:
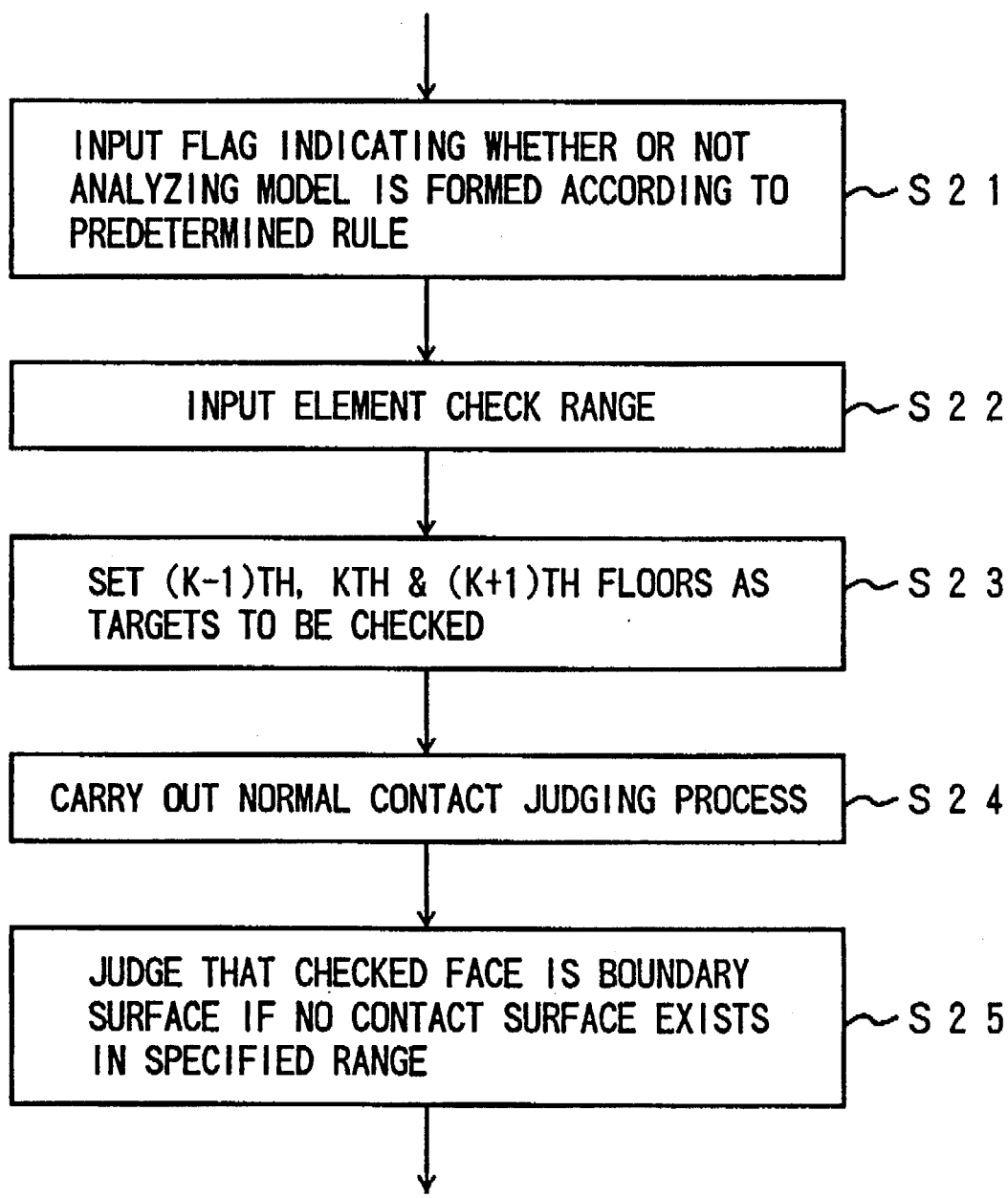
FIG. 23 is a flow chart for explaining a first embodiment of a process which detects a boundary surface.

FIG. 23 is a flow chart for explaining a first embodiment of the process which detects the boundary surface. In a case where the analyzing model used for the finite element method analysis is formed according to a predetermined rule such as a rule which forms a three-dimensional shape by building up from a two-dimensional drawing, for example, the node numbers, the element numbers and the face numbers increase in the same direction among the adjacent elements. In other words, in a case where the analyzing model has the form of an n-story building, each of the nodes in most cases changes by an amount of increase that is determined for each of the floors. For example, if the node numbers are determined such that the node numbers of the first floor portion are 1 to 100, the node numbers of the second floor portion are 101 to 200, the node numbers of the third floor portion are 201 to 300 and the like, the element portions corresponding to each of rooms on each floor are formed by the nodes having the node numbers in the range of the node numbers for the particular floor. For example, each room on the first floor is formed by the nodes having the node numbers in the range of 1 to 100. Hence, if the analyzing model to be processed is formed according to a predetermined rule and K floors are to be checked as in the case of the n-story building, for example, this embodiment does not check all of the elements. Instead, this embodiment only checks the (K−1)th and (K+1)th floors of the n-story building, so as to detect the boundary elements at a high speed.

In FIG. 23, a step S21 inputs a flag which indicates whether or not the analyzing model to be processed is formed according to a predetermined rule. A step S22 inputs and specifies a range in which the elements are to be checked. For example, the inputs in the steps S21 and S22 may be carried out from the keyboard 6 by the operator. If K floors are to be checked, a step S23 sets the (K−1)th, Kth and (K+1)th floors as the floors to be checked. If the above flag indicates that the analyzing model is formed according to the predetermined rule, a step S24 carries out a contact judging process which detects a contact surface with respect to the targets (floors in this case) which are set in the step S23. The contact judging process is carried out as shown in FIGS. 6 and 7, for example. If the contact surface is not detected in the step S24 within the range which is specified by the step S22, a step S25 judges that the checked face (of the floor) is a boundary surface. Hence, not all of the elements are checked, but instead, only the element portions which are likely to be related are checked. As a result, it is possible to reduce the elements which are checked, and accordingly reduce the time required to obtain the information related to the faces of the element which do not make contact with the faces of the other elements.

Figure 24:
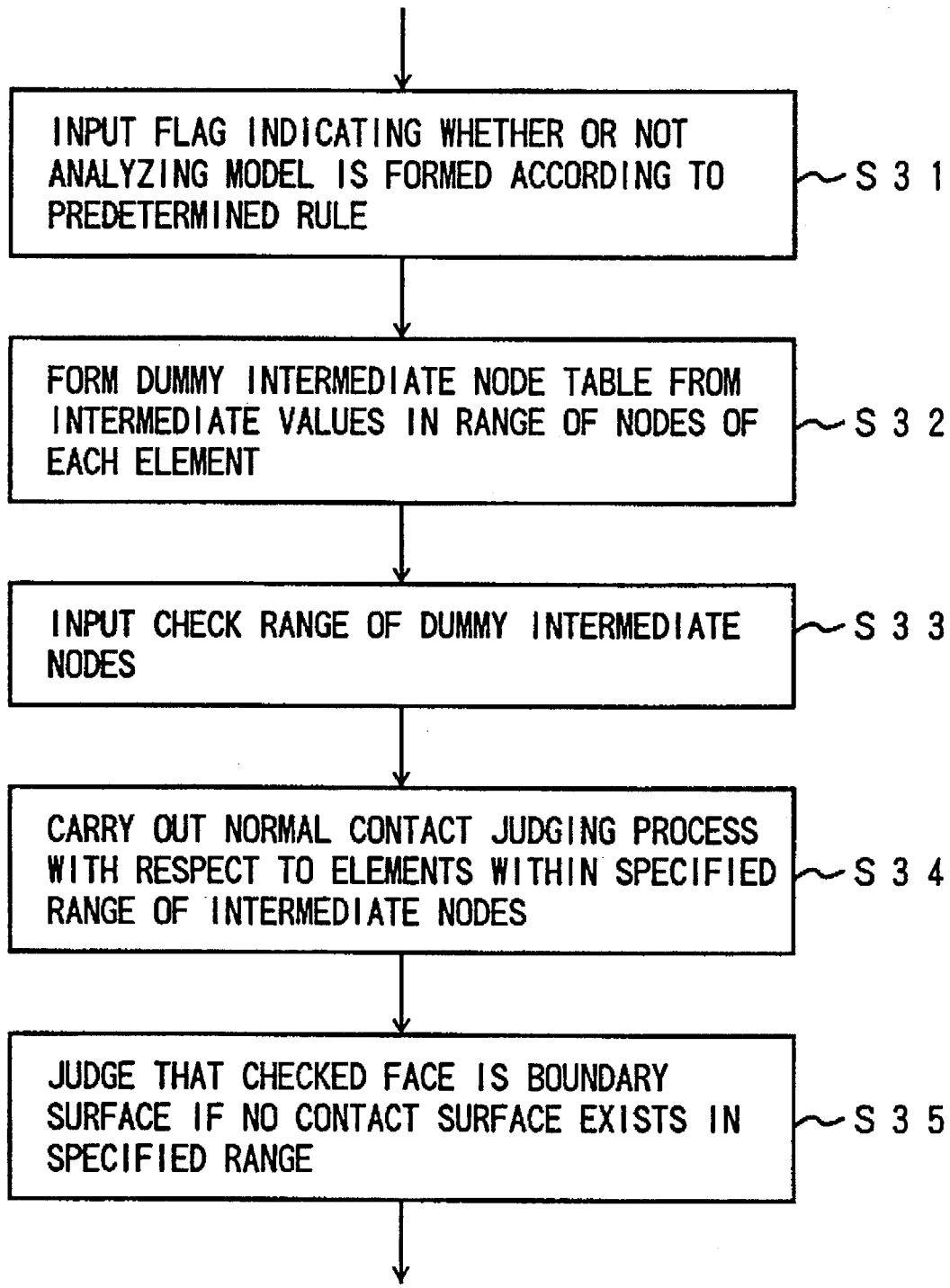
FIG. 24 is a flow chart for explaining a second embodiment of the process which detects the boundary surface.

FIG. 24 is a flow chart for explaining a second embodiment of the process which detects the boundary surface. In this embodiment, if the analyzing model to be processed is formed according to a predetermined rule, a range of the node numbers is obtained, and dummy node numbers are generated intermediate this range. The elements to be checked are limited to those within a predetermined range of the dummy intermediate node numbers, so that the boundary elements can be detected at a high speed.

In FIG. 24, a step S31 inputs a flag which indicates whether or not the analyzing model to be processed is formed according to a predetermined rule. If the above flag indicates that the analyzing model is formed according to the predetermined rule, a step S32 generates the dummy intermediate nodes intermediate the range of the nodes of each of the elements, and forms a dummy intermediate node table which is made up of dummy intermediate node numbers. FIG. 25 is a diagram showing the dummy intermediate node table, and this dummy intermediate node table stores the element numbers and the dummy intermediate node numbers. The dummy intermediate node numbers stored in the dummy intermediate node table respectively have a value which is obtained by adding a minimum node number and a maximum node number of the nodes forming the element and dividing the sum by 2. A step S33 inputs and specifies a checking range of the dummy intermediate nodes. If the checking range of the dummy intermediate nodes is 800 in FIG. 25, a range R1 of the dummy intermediate nodes (2002−800) to (2002+800) becomes the target of the checking with respect to the element number 2023. For example, the inputs in the steps S31 and S33 may be made from the keyboard 6 by the operator. A step S34 carries out a contact judging process which detects a contact surface with respect to the targets, that is, the elements within the specified checking range of the dummy intermediate nodes. The contact judging process is carried out as shown in FIGS. 6 and 7, for example. If the contact surface is not detected in the step S34 within the range which is specified by the step S33, a step S35 judges that the checked face of the target is a boundary surface. Hence, by representing the nodes which form the elements by the dummy intermediate nodes, it becomes possible to judge whether or not the face of an element makes contact with the faces of other elements by only checking the elements which have the dummy intermediate nodes with the dummy intermediate node numbers within a predetermined range. As a result, it is possible to reduce the elements which are checked, and accordingly reduce the time required to obtain the information related to the faces of the element which do not make contact with the faces of the other elements.

Figure 26:
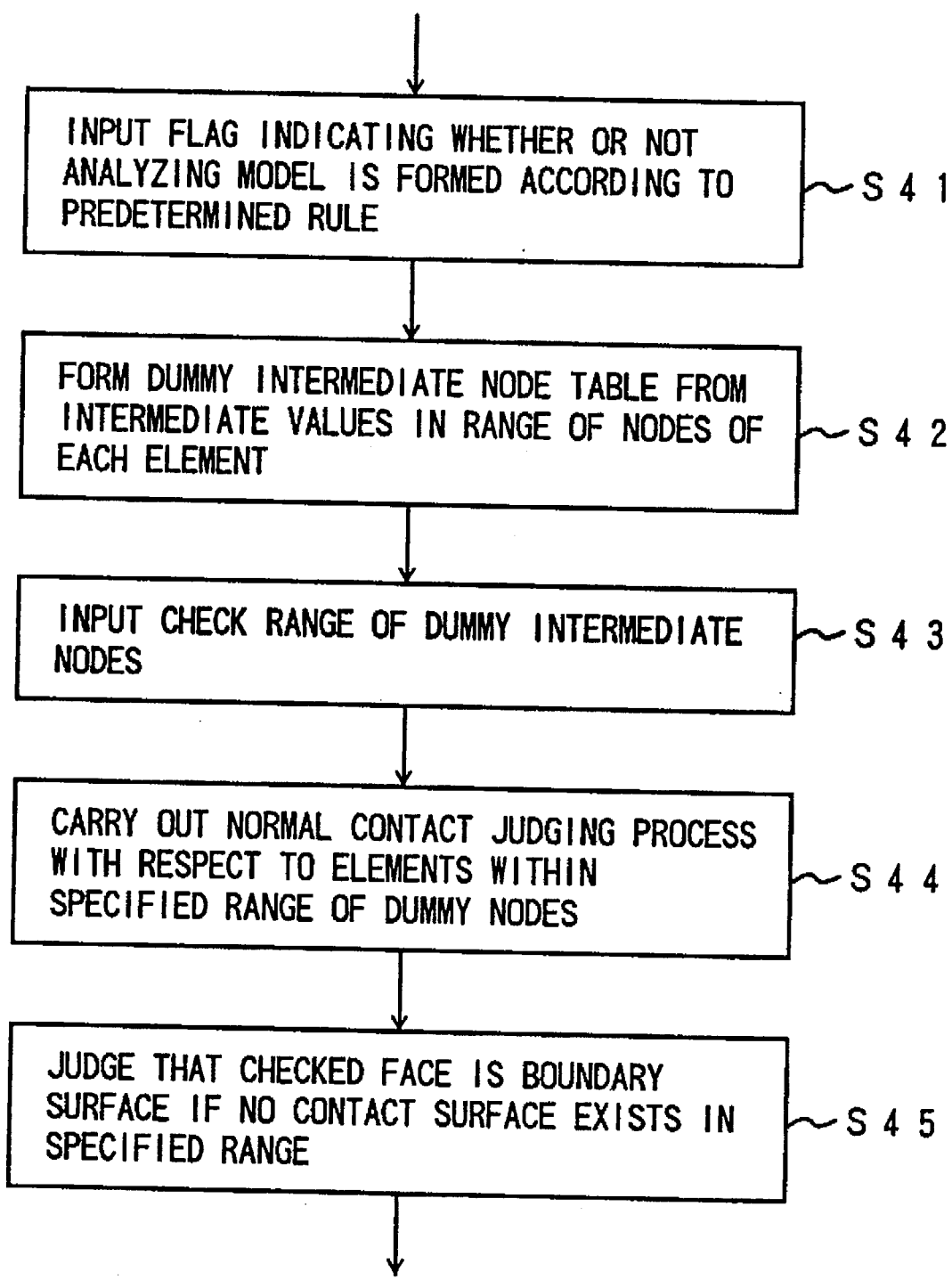
FIG. 26 is a flow chart for explaining a third embodiment of the process which detects the boundary surface.

FIG. 26 is a flow chart for explaining a third embodiment of the process which detects the boundary surface. In this embodiment, if the analyzing model to be processed is formed according to a predetermined rule, the elements to be checked are specified using sum totals of the node numbers, so as to detect the boundary elements at a high speed. Hence, the values stored in the dummy intermediate node table of this embodiment differ from the values stored in the dummy intermediate node table described above. In other words, the sum totals of the node numbers of the nodes forming each of the elements are stored in the dummy intermediate node table of this embodiment.

In FIG. 26, a step S41 inputs a flag which indicates whether or not the analyzing model to be processed is formed according to a predetermined rule. If the above flag indicates that the analyzing model is formed according to the predetermined rule, a step S42 generates the dummy intermediate nodes intermediate the range of the nodes of each of the elements, and forms the dummy intermediate node table which is made up of the sum totals of the dummy nodes of each of the elements. A step S43 inputs and specifies the checking range of the dummy intermediate nodes. For example, the inputs in the steps S41 and S43 may be made from the keyboard 6 by the operator. A step S44 carries out a contact judging process which detects a contact surface with respect to the targets, that is, the elements within the specified checking range of the dummy intermediate nodes. The contact judging process is carried out as shown in FIGS. 6 and 7, for example. If the contact surface is not detected in the step S44 within the range which is specified by the step S43, a step S45 judges that the checked face of the target is a boundary surface. Hence, by representing the nodes which form the elements by the dummy intermediate nodes, it becomes possible to judge whether or not the face of an element makes contact with the faces of other elements by only checking the elements which have the dummy intermediate nodes with the dummy intermediate node numbers within a predetermined range. As a result, it is possible to reduce the elements which are checked, and accordingly reduce the time required to obtain the information related to the faces of the element which do not make contact with the faces of the other elements.

Figure 27:
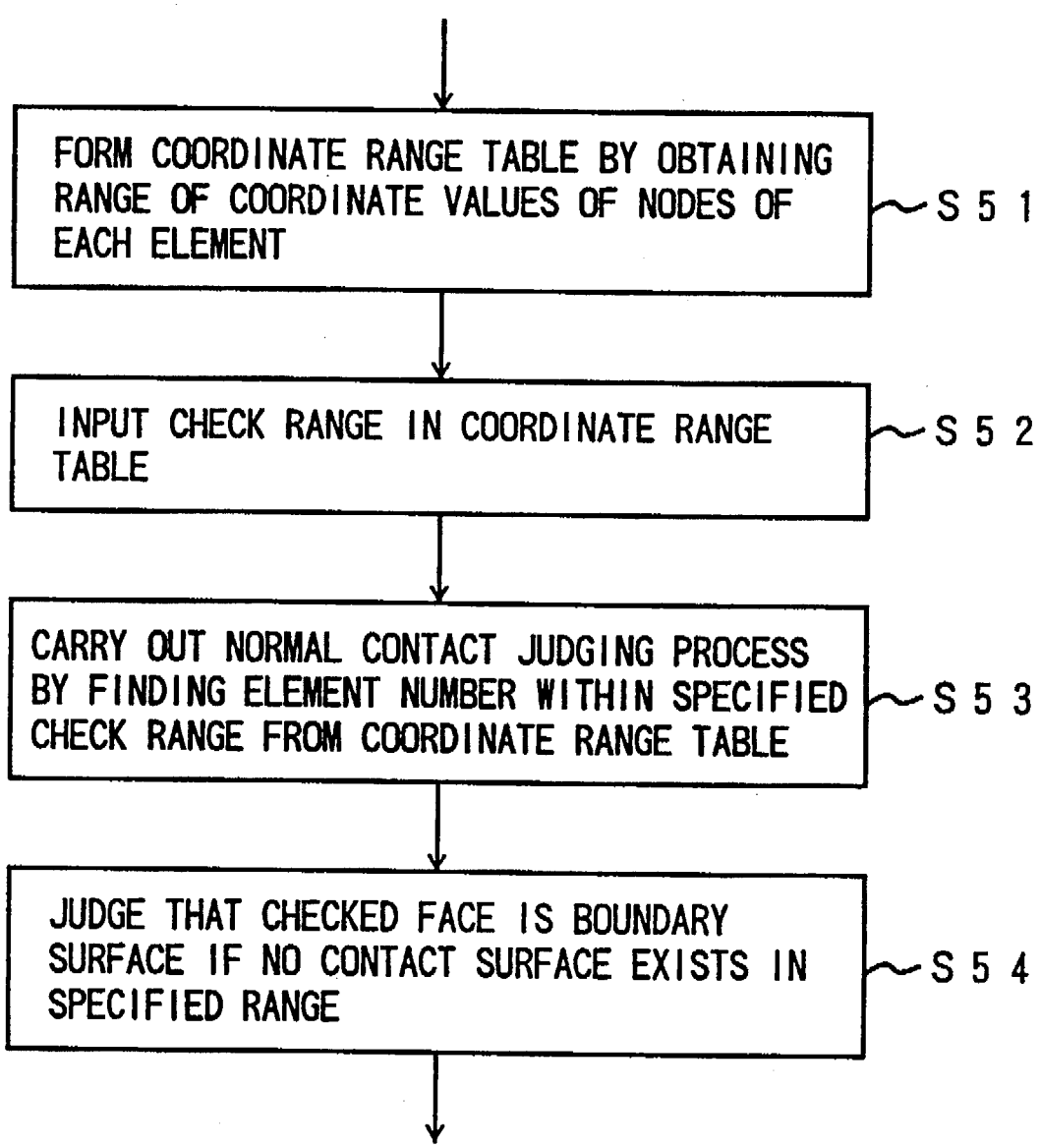
FIG. 27 is a flow chart for explaining a fourth embodiment of the process which detects the boundary surface.

FIG. 27 is a flow chart for explaining a fourth embodiment of the process which detects the boundary surface. In this embodiment, maximum values and minimum values of the coordinate values of the node numbers are stored, and the elements to be checked are specified in order to detect the boundary elements at a high speed.

In FIG. 27, a step S51 obtains a coordinate range of the nodes of each of the elements, and forms a coordinate range table. FIG. 28 is a diagram showing the coordinate range table. The maximum values and the minimum values are obtained for the X-axis, Y-axis and Z-axis directions out of the coordinate values of the nodes forming the elements, and the maximum and minimum values are stored in the coordinate range table together with the element numbers. In FIG. 28, Xmin and Xmax respectively indicate the minimum values and the maximum values for the X-axis direction of the node coordinates, Ymin and Ymax respectively indicate the minimum values and the maximum values for the Y-axis direction of the node coordinates, and Zmin and Zmax respectively indicate the minimum values and the maximum values for the Z-axis direction of the node coordinates, A step S52 inputs and specifies an checking range in the coordinate range table. The input is made by giving an absolute value of the value which is to be subtracted from the minimum value or added to the maximum value for each of the X, Y and Z directions, and subtracting the absolute values from the minimum values in the X, Y and Z directions or adding the absolute values to the maximum values in the X, Y and Z directions for each of the elements to specify the checking range. For example, the input in the step S52 may be made from the keyboard 6 by the operator. A step S53 finds the element numbers within the specified checking range from the coordinate range table, and carries out a contact judging process which detects a contact surface with respect to the elements having the found element numbers. The contact judging process is carried out as shown in FIGS. 6 and 7, for example. If the contact surface is not detected in the step S53 within the checking range which is specified by the step S52, a step S54 judges that the checked face of the target is a boundary surface. Hence, by storing the maximum and minimum values of the coordinate values of the nodes forming the element with respect to each of the elements, and by obtaining the range of the checking by adding a numerical value to the maximum value and subtracting a numerical value from the minimum value of the coordinate values of the nodes forming the element of the comparing source, it becomes possible to set as the element of the comparing destination an element which has a maximum and a minimum of the coordinate values of the nodes forming the element within this range. As a result, it is possible to reduce the elements which are checked, and accordingly reduce the time required to obtain the information related to the faces of the element which do not make contact with the faces of the other elements.

Figure 29:
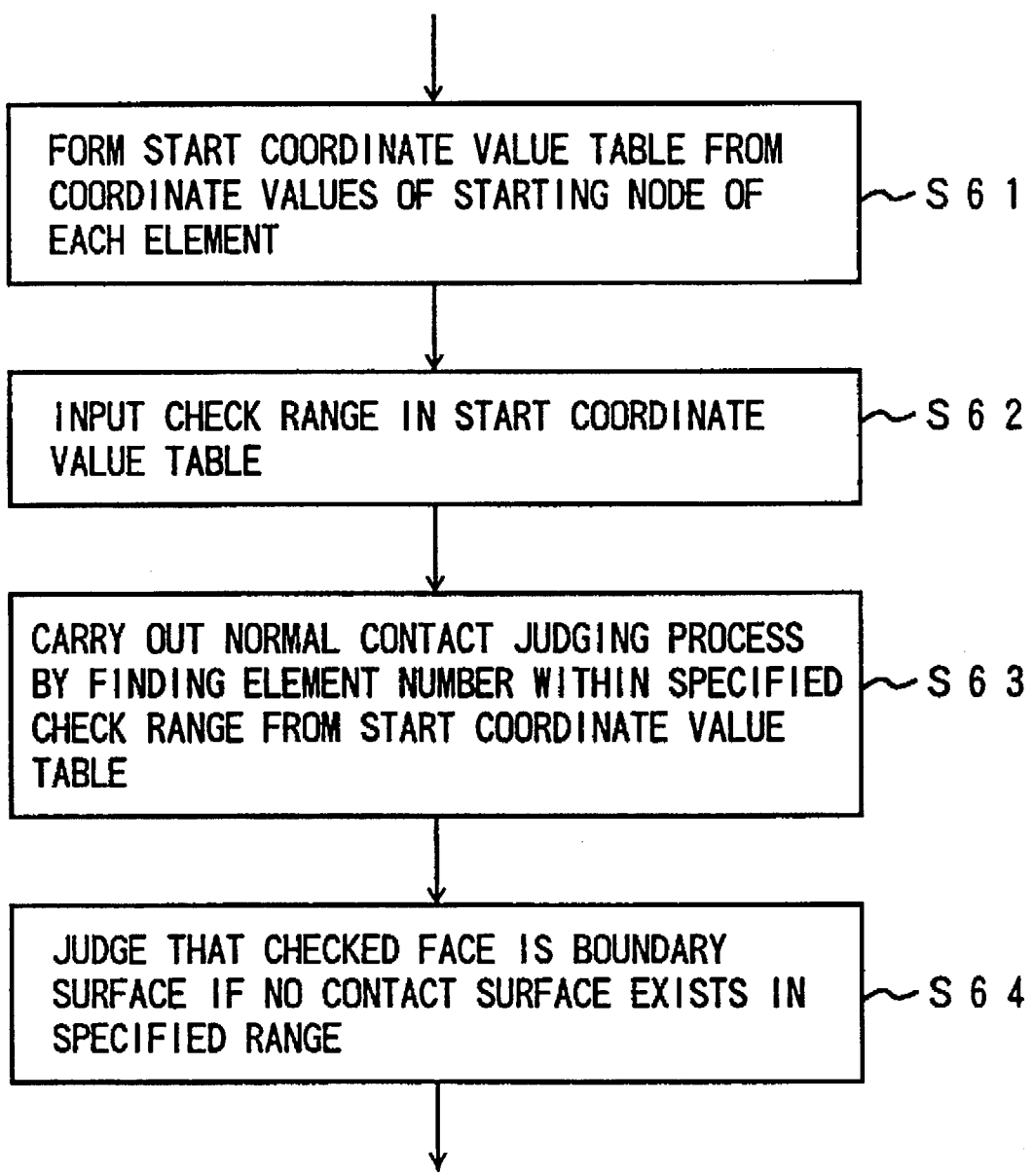
FIG. 29 is a flow chart for explaining a fifth embodiment of the process which detects the boundary surface.

FIG. 29 is a flow chart for explaining a fifth embodiment of the process which detects the boundary surface. In this embodiment, the element to be checked is specified by using the coordinate values of the nodes stored at the start of a table which stores the node numbers of the nodes forming the elements, so that the boundary elements are detected at a high speed.

In FIG. 29, a step S61 forms a starting coordinate value table from the coordinate values of starting nodes of each of the elements. In other words, the table which stores the node numbers of the nodes forming the elements is formed beforehand, and the step S61 uses the X, Y and Z coordinate values of the nodes stored at the start of this table so as to form the start coordinate value table shown in FIG. 30. In FIG. 30, X, Y and Z respectively indicate the X, Y and Z coordinate values of the nodes stored at the start of the table which stores the node numbers of the nodes forming the elements. A step S62 inputs and specifies a checking range in the start coordinate value table. A step S63 finds the element numbers within the specified checking range from the start coordinate value table, and carries out a contact judging process which detects a contact surface with respect to the elements having the found element numbers. The contact judging process is carried out as shown in FIGS. 8 and 7, for example. If the contact surface is not detected in the step S83 within the checking range which is specified by the step S62, a step S64 judges that the checked face of the target is a boundary surface. Hence, by using the elements and the coordinate values of the starting nodes of the nodes forming the elements, and by extracting only those elements within a range of a predetermined distance from the coordinate values of the starting nodes of the elements to be checked, it becomes possible to check only the existence of the connections with the extracted elements. As a result, it is possible to reduce the elements which are checked, and accordingly reduce the time required to obtain the information related to the faces of the element which do not make contact with the faces of the other elements.

Figure 31:
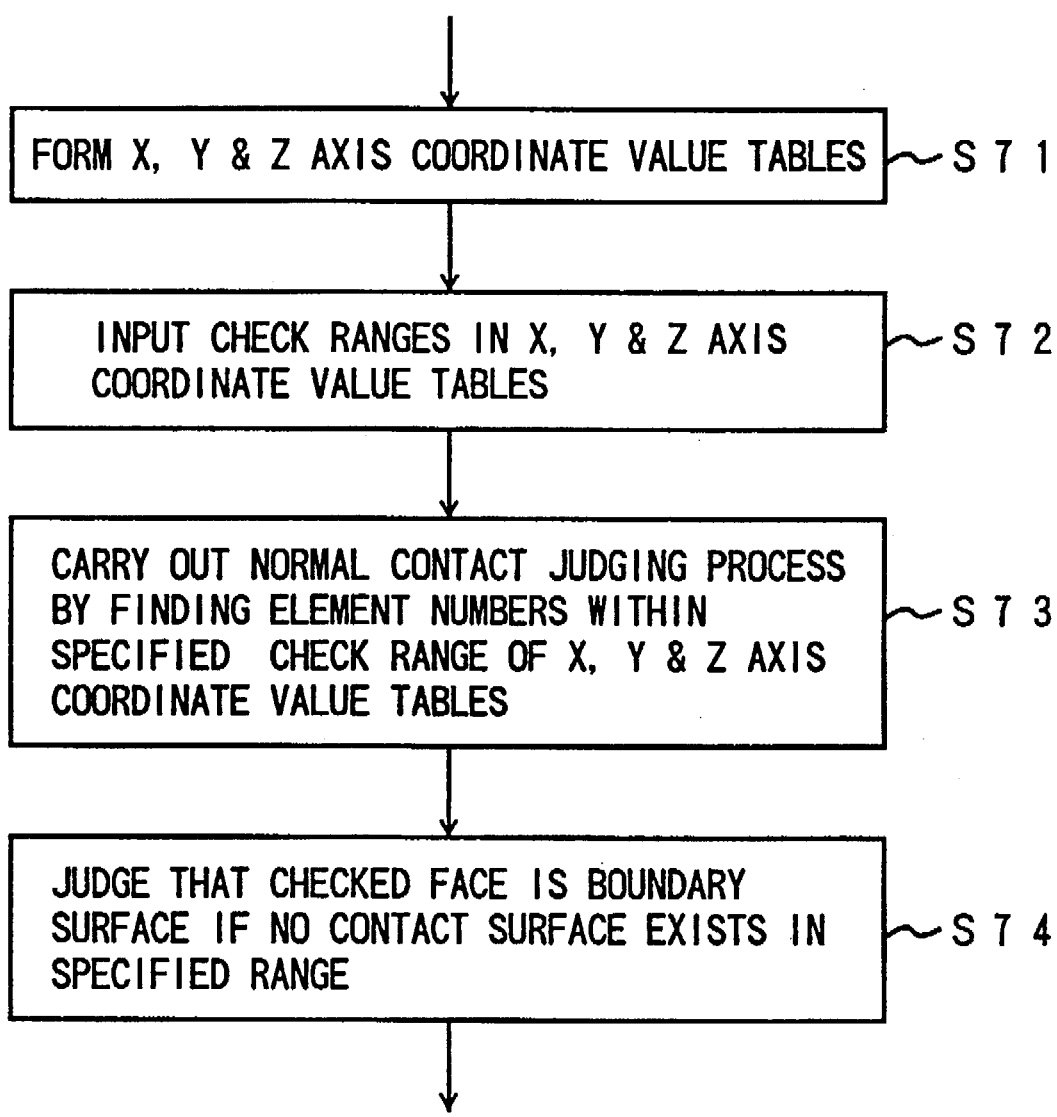
FIG. 31 is a flow chart for explaining a sixth embodiment of the process which detects the boundary surface.

FIG. 31 is a flow chart for explaining a sixth embodiment of the process which detects the boundary surface. In this embodiment, the coordinate values of the nodes stored at the start of the table which stores the node numbers of the nodes forming the elements are used, so as to form a X-axis coordinate value table, a Y-axis coordinate value table and a Z-axis coordinate value table. The X-axis coordinate value table, the Y-axis coordinate value table and the Z-axis coordinate value table respectively store the coordinate values of the starting nodes out of the nodes forming each of the elements, in a sequence rearranged depending on the value and starting from the smallest value, together with the element numbers. The elements to be checked are specified by use of the X-axis coordinate value table, the Y-axis coordinate value table and the Z-axis coordinate value table, so that the boundary elements can be detected at a high speed. Hence, according to this embodiment, the start coordinate value table such as that shown in FIG. 30 is formed independently with respect to each of the X, Y and Z coordinate axes. In addition, in each of the X-axis coordinate value table, the Y-axis coordinate value table and the Z-axis coordinate value table, the coordinate values of the starting nodes are rearranged in the sequence depending on the value and starting from the smallest value.

In FIG. 31, a step S71 rearranges the coordinate values of the starting nodes out of the nodes forming each of the elements in a sequence depending on the value and starting from the smallest value, and forms the X-axis coordinate value table, the Y-axis coordinate value table and the Z-axis coordinate value table which store the rearranged coordinate values together with the element numbers. In other words, the X-axis coordinate values of the starting nodes out of the nodes forming each of the elements are rearranged in a sequence starting from the smallest value and stored in the X-axis coordinate value table together with the element numbers. Similarly, the Y-axis coordinate values of the starting nodes out of the nodes forming each of the elements are rearranged in a sequence starting from the smallest value and stored in the Y-axis coordinate value table together with the element numbers. Further, the Z-axis coordinate values of the starting nodes out of the nodes forming each of the elements are rearranged in a sequence starting from the smallest value and stored in the Z-axis coordinate value table together with the element numbers. A step S72 inputs and specifies checking ranges in the X-axis coordinate value table, the Y-axis coordinate value table and the Z-axis coordinate value table. The input in the step S72 is made by the operator from the keyboard 6, for example. A step S73 finds the element numbers within the specified checking ranges from the X-axis coordinate value table, the Y-axis coordinate value table and the Z-axis coordinate value table, and carries out a contact judging process which detects a contact surface with respect to the elements having the found element numbers. The contact judging process is carried out as shown in FIGS. 6 and 7, for example. If the contact surface is not detected in the step S73 within the checking range which is specified by the step S72, a step S74 judges that the checked face of the target is a boundary surface. Hence, this embodiment uses the X-axis, Y-axis and Z-axis coordinate value tables which store the coordinate values of the starting nodes in the sequence rearranged starting from the minimum value to the maximum value for the respective X-axis, Y-axis and Z-axis out of the nodes forming each of the elements, together with the element numbers. For this reason, when detecting an element which has a face making contact with a face of a specific element, the process of checking only the elements within the ranges specified in the X-axis, Y-axis and Z-axis coordinate value tables can be carried out at a high speed in a simple manner. Therefore, it is possible to reduce the elements which are checked, and accordingly reduce the time required to obtain the information related to the faces of the element which do not make contact with the faces of the other elements.

Figure 32:
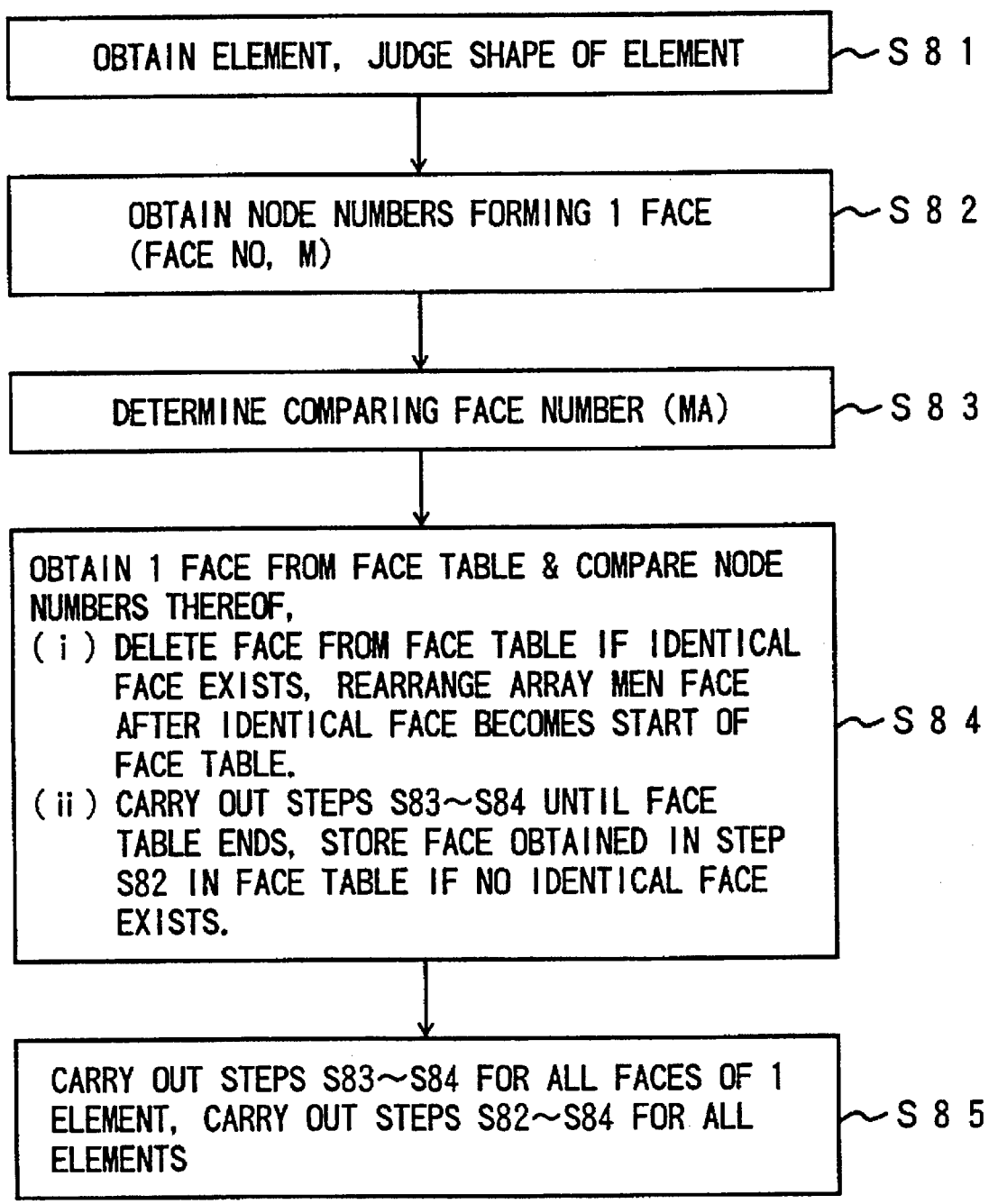
FIG. 32 is a flow chart for explaining a seventh embodiment of the process which detects the boundary surface.

FIG. 32 is a flow chart for explaining a seventh embodiment of the process which detects the boundary surface. This embodiment utilizes the fact that the face numbers are assigned in the same direction among the adjacent elements of the analyzing model which is used for the finite element method analysis. Hence, by checking the face numbers of the other elements according to a predetermined rule instead of starting from the face number 1, it becomes possible to detect the boundary elements at a high speed.

In FIG. 32, a step S81 obtains the elements of the analyzing model and judges the shapes of the elements. A step S82 obtains the node numbers of the nodes forming a face having an arbitrary face number M. A step S83 determines a face number MA of a face which is to be compared. A step S84 obtains 1 face from a face table and compares the node numbers thereof with the node numbers of the face having the face number MA. If the node numbers of the face obtained from the face table matches those of the face having the face number MA, the face obtained from the face table is deleted from the face table. In this case, the faces in the face table are rearranged so that the face following next to the deleted face is positioned to the start of the face table, and the process thereafter returns to the step S82. On the other hand, if a face having the same node numbers as the face having the face number MA is not found in the face table even after the processes of the steps S83 and S84 end, the face obtained in the step S82 and having the face number M is stored in the face table. A step S85 carries out the above steps S83 and S84 with respect to all of the faces of the element, and furthermore, carries out the steps S82 through S84 with respect to all of the elements.

Therefore, the face number of the comparing source which becomes the face number of the comparing destination can be determined not only from the face number 1 but with priority starting from the face number of the face which has a high possibility of making contact with the face of another element. For this reason, the faces which make mutual contact can be detected at a high speed, thereby making it possible to detect the boundary elements at a high speed.

Next, a more detailed description will be given of the seventh embodiment of the process which detects the boundary surface, by referring to FIGS. 33 through 43.

Figures 33, 34:
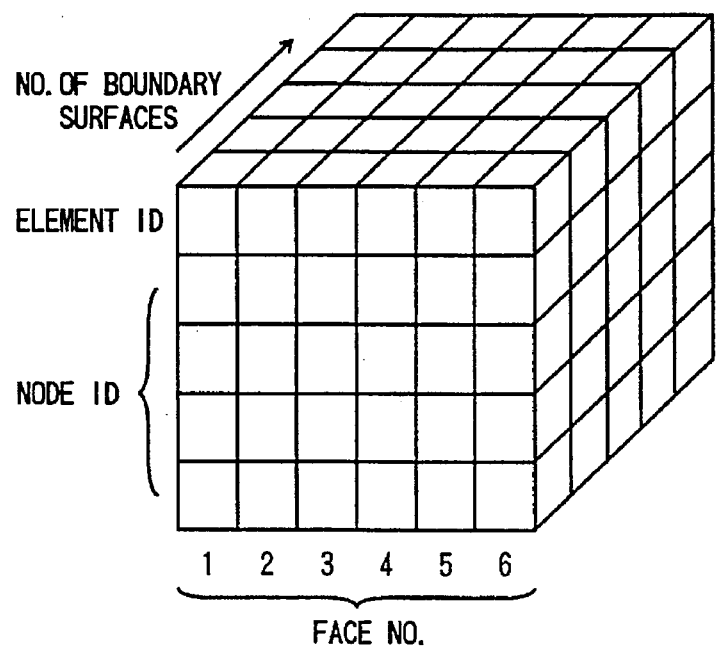
FIG. 33 is a diagram showing a two-dimensional array IELM.
FIG. 34 is a diagram showing a three-dimensional array MEN.

First, this embodiment uses a two-dimensional array IELM(14,KB) shown in FIG. 33 as the region which stores the elements. In FIG. 33, the two-dimensional array IELM (14,KB) stores 14 fields of information including an element identification (ID) and an element identifying index assigned to each element, a node ID assigned to the nodes forming each element and the like with the arrangement shown for each of the element numbers 1 through LB.

In addition, this embodiment uses a three-dimensional array MEN(5,MC,6) shown in FIG. 34 as the region which stores the boundaries.

Furthermore, this embodiment uses a one-dimensional array MN(6) shown in FIG. 35 as the region which stores the boundary surface numbers. In FIG. 35, 6 boundary face numbers are stores for the face numbers 1 through 6.

In order to specify which node of the two-dimensional array IELM is to be read, a two-dimensional array IC(4,L) shown in FIG. 38 is used. This two-dimensional array IC(4,L) stores the position of the node which is to be read from the two-dimensional array IELM depending on the shape of the element and the face number. FIG. 38 shows a case where 4 read positions are stored with respect to each face number, where shapes 1 through N such as a 4-face polygon, a 5-face polygon, a 6-face polygon and the like are determined depending on the node number.

Figure 37:
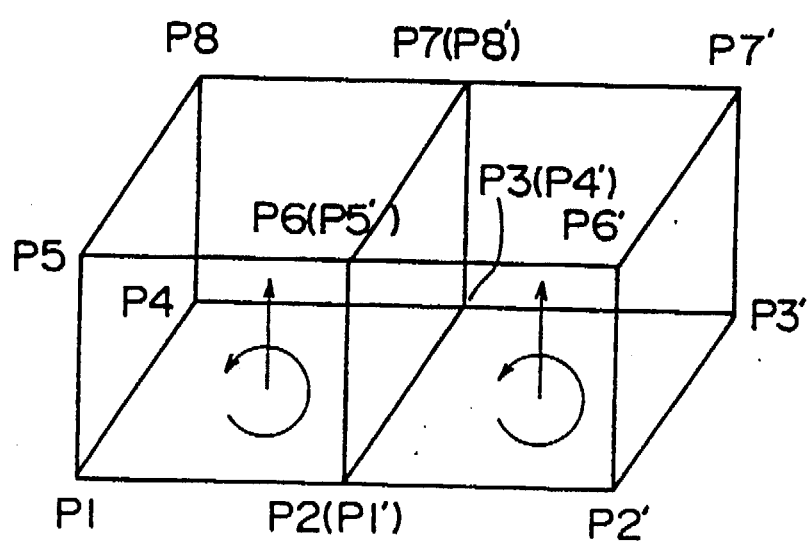
FIG. 37 is a diagram for explaining a retrieval sequence of nodes forming an element.

FIG. 37 is a diagram for explaining a retrieval sequence of the nodes forming the element. With respect to the analyzing model portion shown on the left side of FIG. 37, the relationship of the face numbers 1 to 6 and the retrieval sequence of the nodes having the node numbers P1 to P8 is as follows.

Face Number 1:P1→P2→P3→P4
Face Number 2:P5→P6→P7→P8
Face Number 3:P1→P2→P6→P5
Face Number 4:P2→P3→P7→P6
Face Number 5:P3→P4→P8→P7
Face Number 6:P4→P1→P5→P8

On the other hand, with respect to the analyzing model portion shown on the right side of FIG. 37, the relationship of the face numbers 1 to 6 and the retrieval sequence of the nodes having the node numbers P1' to P8' is as follows.

Face Number 1: P1'→P2'→P3'→P4'
Face Number 2: P5'→P6'→P7'→P8'
Face Number 3: P1'→P2'→P6'→P5'
Face Number 4: P2'→P3'→P7'→P6'
Face Number 5: P3'→P4'→P8'→P7'
Face Number 6: P4'→P1'→P5'→P8'

FIG. 38 is a diagram for explaining an element forming sequence. In FIG. 38, the numerals indicate the element numbers. In this particular case shown, the elements having the element numbers 1, 2, . . . , 11, 12, . . . , 21, 22, . . . are formed in this sequence.

In the following description, it will be assumed for the sake of convenience that a two-dimensional array MAC(6,6) is used to set the face numbers to be compared depending on the obtained face numbers. FIG. 39 is a diagram showing this two-dimensional array MAC(6,6).

Generally, the analyzing model use in the finite element method analysis is formed regularly as may be seen from FIGS. 37 and 38. If the sequence of the nodes forming the elements are the same as shown in FIG. 37, it is possible to anticipate faces which may be judged as being the same depending on the face numbers. For example, in the case of the 6-face polygon shown in FIG. 37, it may be anticipated that the face having the face number 4 and the face having the face number 6 are the same. In addition, considering the fact that the elements are formed in sequence and stored in an ascending order in the two-dimensional array IELM as shown in FIG. 38, it may be regarded that the face which is judged as being the same as another is stored next to the face which is judged immediately before as being the same with another.

Figure 40:
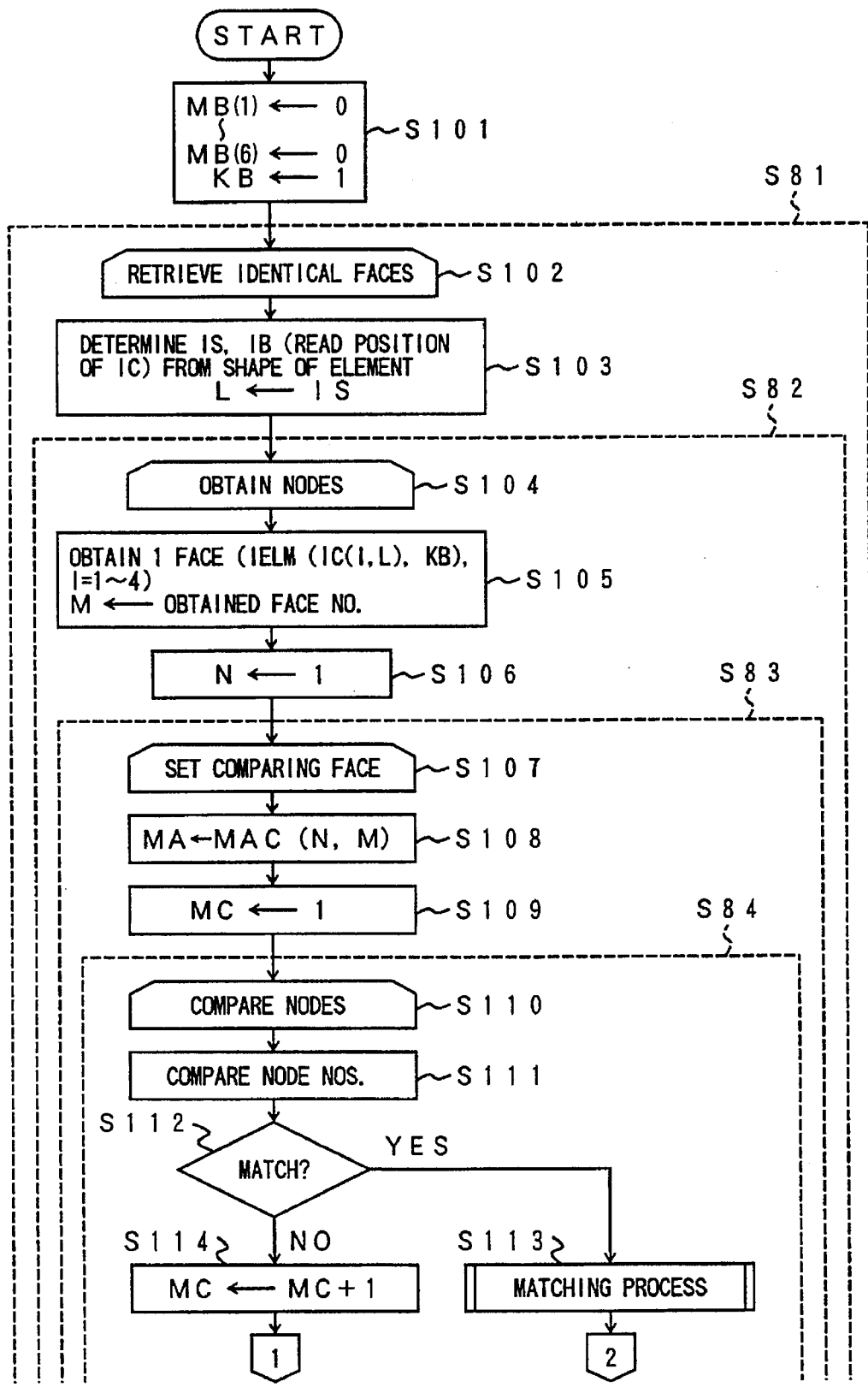
FIGS. 40 and 41 respectively are flow charts for explaining a process shown in FIG. 32 in more detail.
Figure 41:
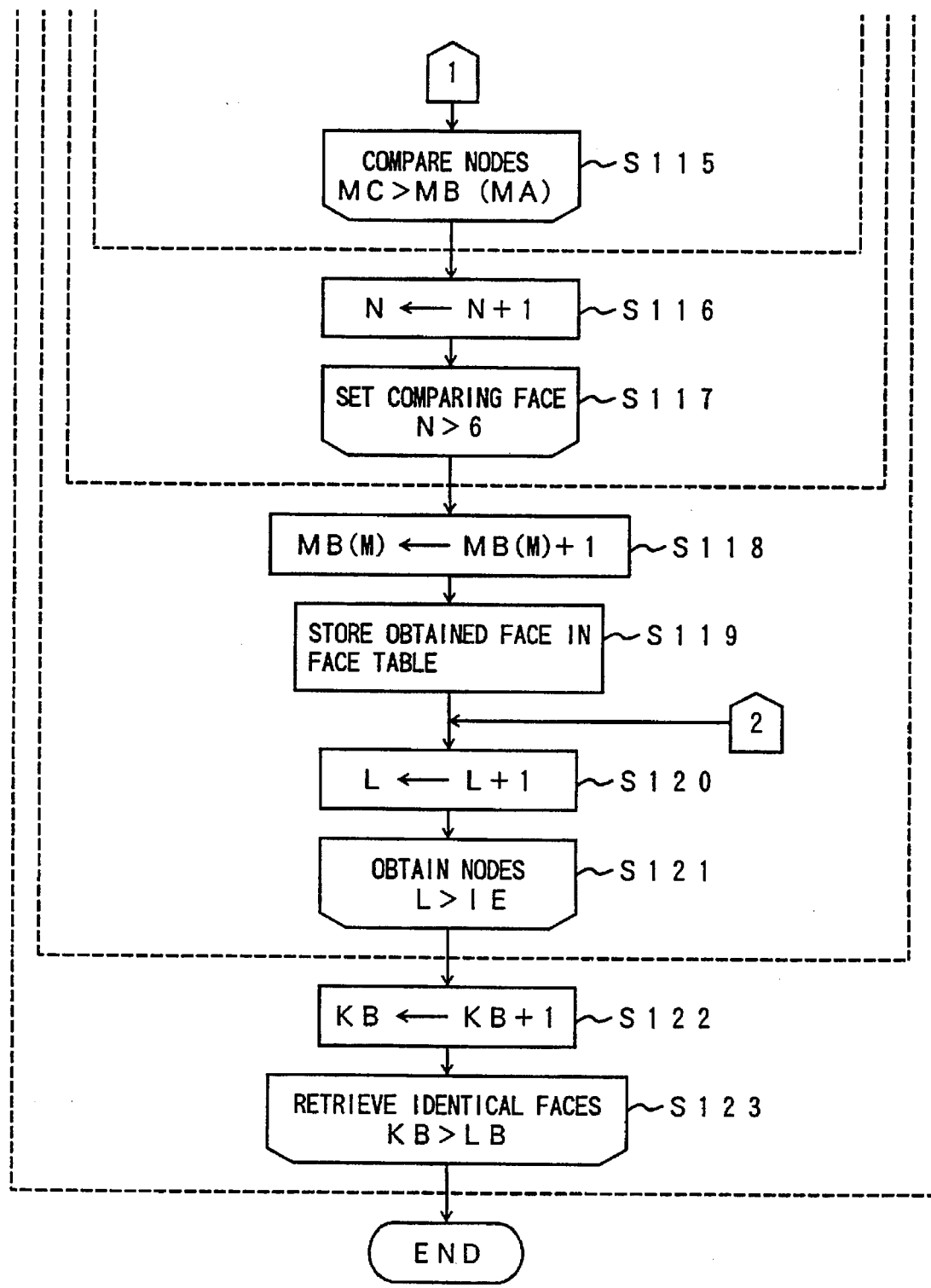

FIGS. 40 and 41 respectively are flow charts for explaining the process shown in FIG. 32 in more detail. In FIGS. 40 and 41, those steps which are the same as those corresponding steps in FIG. 32 are designated by the same reference numerals and indicated by the dotted line.

In FIG. 40, a step S101 sets initial values. More particularly, MB(1) through MB(6) are set to 0, and KB is set to 1.

A step S102 starts an identical face retrieval loop (step S81) which retrieves the identical faces of the analyzing model from the three-dimensional array MEN(5,MC,6), for example. A step S103 judges the shape of the element from the two-dimensional array IELM(3,KB), and determines a suffix (IS,IE) of the two-dimensional array IC(4,L) which specifies the position of the node number from which the reading is to start from the two-dimensional array IELM(3, KB). As described above, the two-dimensional array IC(4,L) prestores data indicating the positions of the node numbers to be read with respect to each of the face numbers 1 to 6 depending on the shape of the element.

A step S104 starts a node obtaining loop (step S82) which obtains the nodes from the two-dimensional array IELM(3, KB). A step S105 reads 1 face (IELM(IC(I,L),KB),(I=1~4)), and defines the face number of the 1 face which is read as the face number M of the face of the comparing source. In addition, a step S106 sets N to 1.

A step S107 starts a comparing face setting loop (step S83) which sets the face of the comparing destination from the two-dimensional array MAC(N,M) based on the face number M. A step S108 determines the face number MA of the comparing destination from the two-dimensional array MAC(N,M) based on the face number M read in the step S105. As described above, the sequence of the face numbers of the comparing destination is determined in advance with respect to the face numbers 1 to 6 in the two-dimensional array MAC(N,M), and the face numbers are stored in the determined sequence. As a result, the faces of the comparing destination are obtained from the face table. A step S109 sets MC to 1.

A step S110 starts a node comparing loop (step S84) which compares the node numbers of the face of the comparing source obtained in the step S105 and the node numbers of the face of the comparing destination obtained in the step S108. A step S111 compares the node numbers of the face of the comparing source and the node numbers of the face of the comparing destination. A step S112 decides whether or not all of the compared node numbers match. If the decision result in the step S112 is YES, a step S113 deletes the face of the comparing destination from the face table by carrying out a matching process. The matching process rearranges the faces in the face table so that the face which is next to the face that is judged as being the same is positioned at the start of the face table. After the step S113 ends, the process advances to a step S120 shown in FIG. 41 which will be described later. On the other hand, if the decision result in the step S112 is NO, a step S114 increments MC to MC+1, and the process advances to a step S115 shown in FIG. 41.

Figure 42:
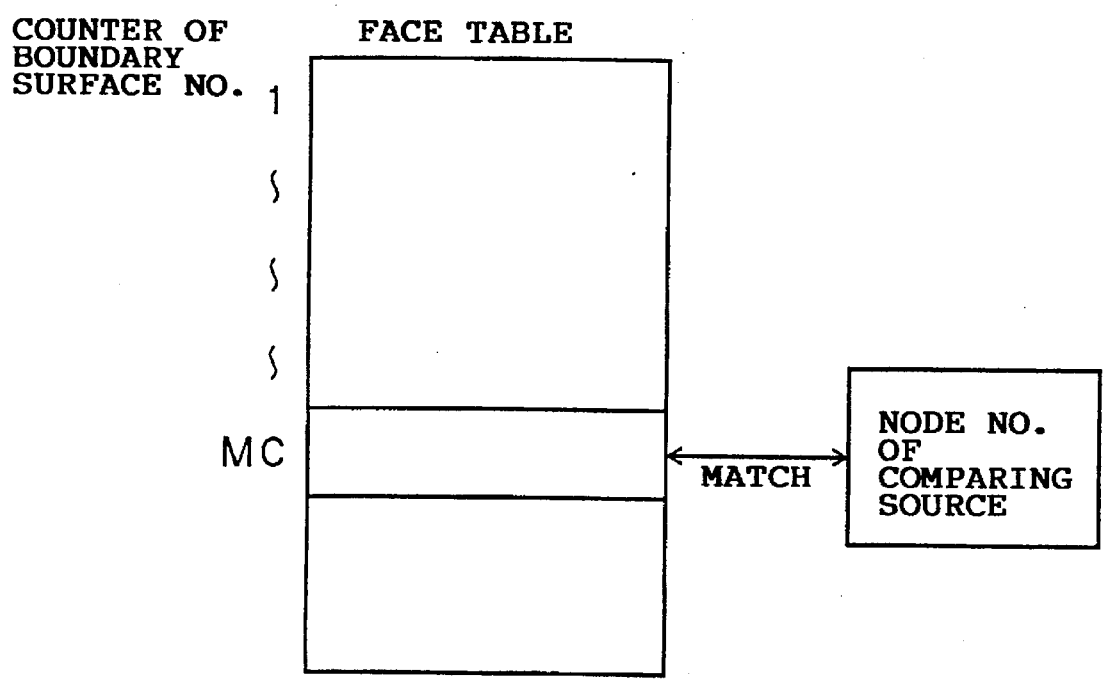
FIG. 42 is a diagram showing a face table in a state where node numbers of a face at a comparing destination and having a boundary surface counter value which is a three-dimensional array MEN(1~4, MC, MA) and node numbers of a face at a comparing source all match.

FIG. 42 is a diagram showing the face table in a state where all of the node numbers of the face of the comparing destination having the boundary surface counter value which is the three-dimensional array MEN(1~4,MC,MA) match the node numbers of the face of the comparing source. In FIG. 42, the boundary surface counter value is shown on the left side.

Figure 43:
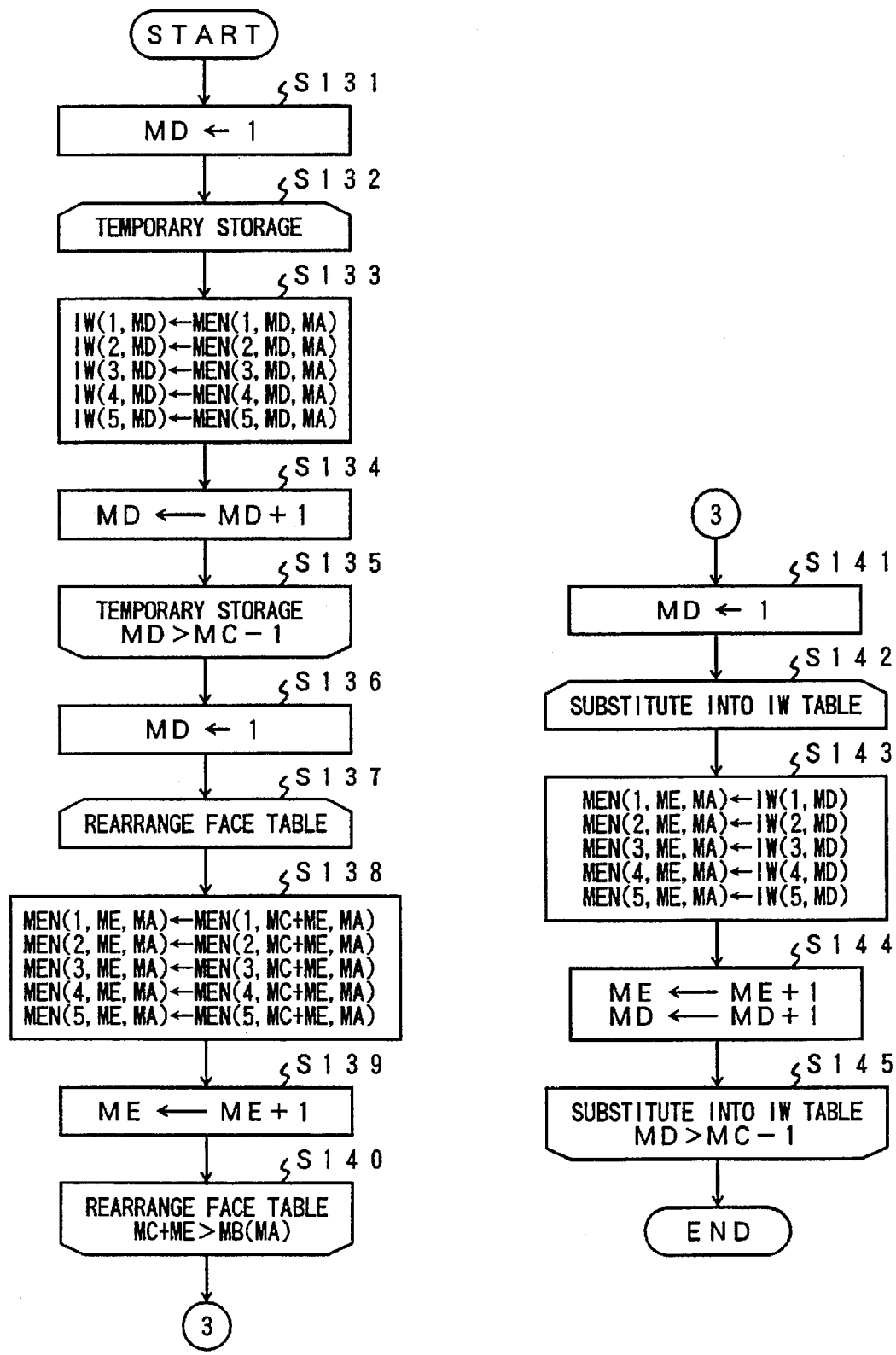
FIG. 43 is a flow chart for explaining a matching process carried out in a step S113 shown in FIG. 40 in more detail.

FIG. 43 is a flow chart for explaining the matching process carried out by the step S113 in more detail. In FIG. 43, a step S131 sets MD to 1. A step S132 starts a temporary data store process. In other words, when a buffer region which temporarily stores the data is denoted by IW, a step S133 temporarily stores the three-dimensional array MEN (1,MD,MA) in the buffer region IW(1,MD), the three-dimensional array MEN(2,MD,MA) in the buffer region IW(2,MD), the three-dimensional array MEN(3,MD,MA) in the buffer region IW(3,MD), the three-dimensional array MEN(4,MD,MA) in the buffer region IW(4,MD), and the three-dimensional array MEN(5,MD,MA) in the buffer region IW(5,MD). A step S134 increments MD to MD+1. The buffer region IW may be formed by an internal memory region of the CPU 1, a memory region of the memory 2 and the like.

A step S135 ends the process which temporarily stores the data when MD>MC-1. A step S136 sets ME to 1. A step S137 starts a process which rearranges the data in the face table. In other words, a step S138 rearranges the data of the three-dimensional array MEN(1,MC+ME MA) to the three-dimensional array MN(1,ME,MA) the data of the three-dimensional array MEN(2,MC+ME MA) to the three-dimensional array MN(2,ME,MA) the data of the three-dimensional array MEN(3,MC+ME MA) to the three-dimensional array MN(3,ME,MA) the data of the three-dimensional array MEN(4,MC+ME,MA) to the three-dimensional array MN(4,ME,MA), and the data of the three-dimensional array MEN(5,MC+ME,MA) to the three-dimensional array MN(5,ME,MA). A step S139 increments ME to ME+1.

A step S140 ends the process which rearranges the data in the face table when MC+ME>MB(MA). A step S141 sets MD to 1. A step S142 starts a process which substitutes the data within the buffer IW into the face table. In other words, a step S143 substitutes the data within the buffer IW(1,MD) into the three-dimensional array MEN(1,ME,MA), the data within the buffer IW(2,MD) into the three-dimensional array MEN(2,ME,MA), the data within the buffer IW(3,MD) into the three-dimensional array MEN(3,ME,MA), the data within the buffer IW(4,MD) into the three-dimensional array MEN(4,ME,MA), and the data within the buffer IW(5,MD) into the three-dimensional array MEN(5,ME,MA).

A step S144 increments ME to ME+1, and increments MD to MD+1. A step S145 ends the process which substitutes the data within the buffer IW into the face table when MD>MC-1.

Figure 44:
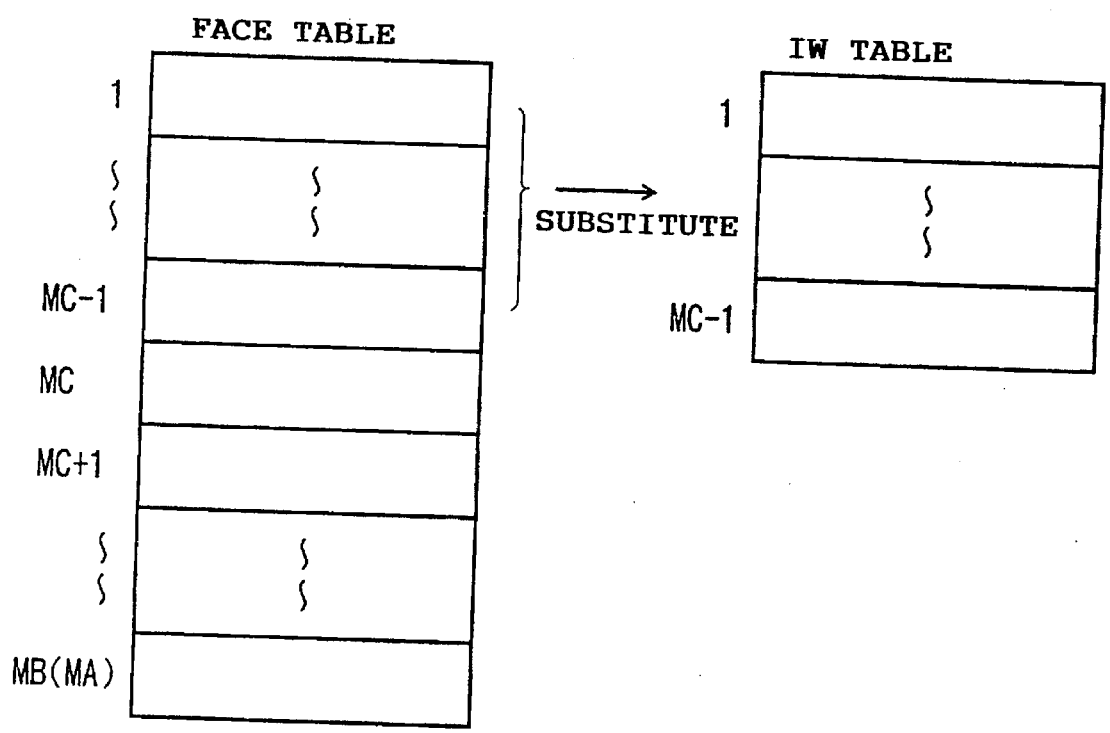
FIG. 44 is a diagram showing a state where data at a part where the boundary surface counter value of the face table is 1~MC−1 are stored at a part where the boundary surface counter value of a buffer IW is 1~MC−1.
Figure 45:
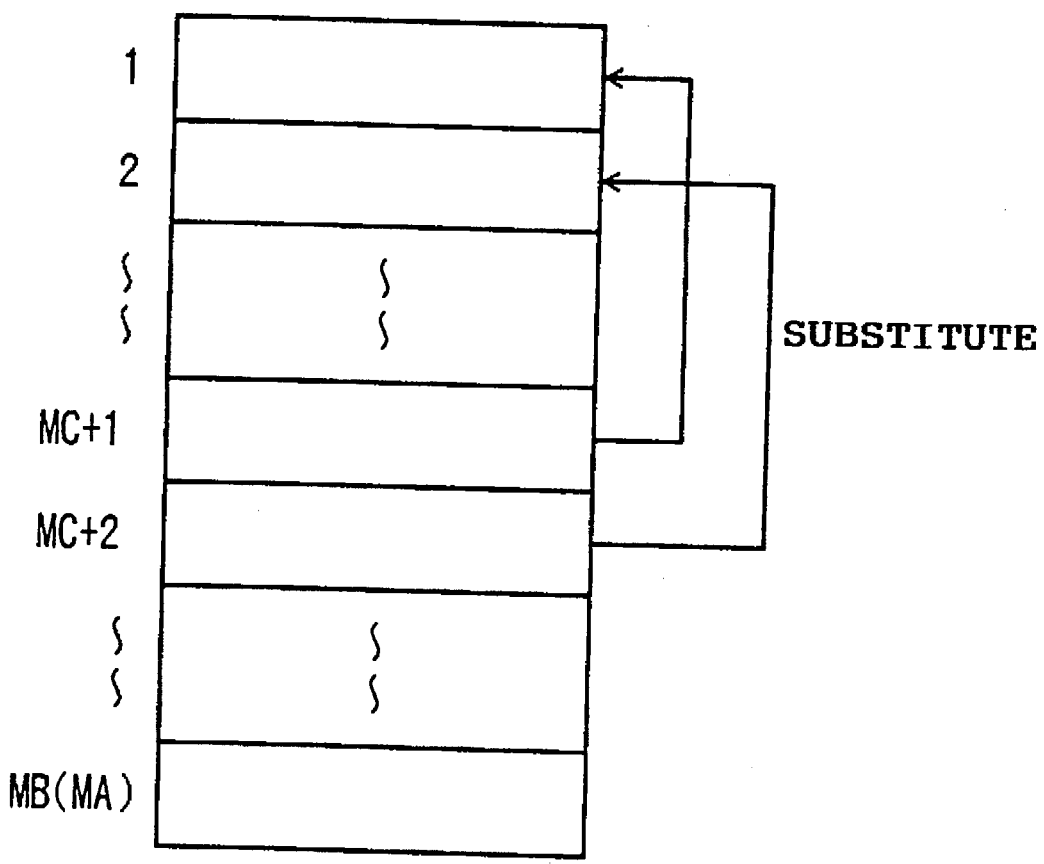
FIG. 45 is a diagram showing a state where data at a part where the boundary surface counter value of the face table is MC+1~MC(MA) are successively substituted into a part where the boundary surface counter value is 1~MC(MA)−1.
Figure 46:
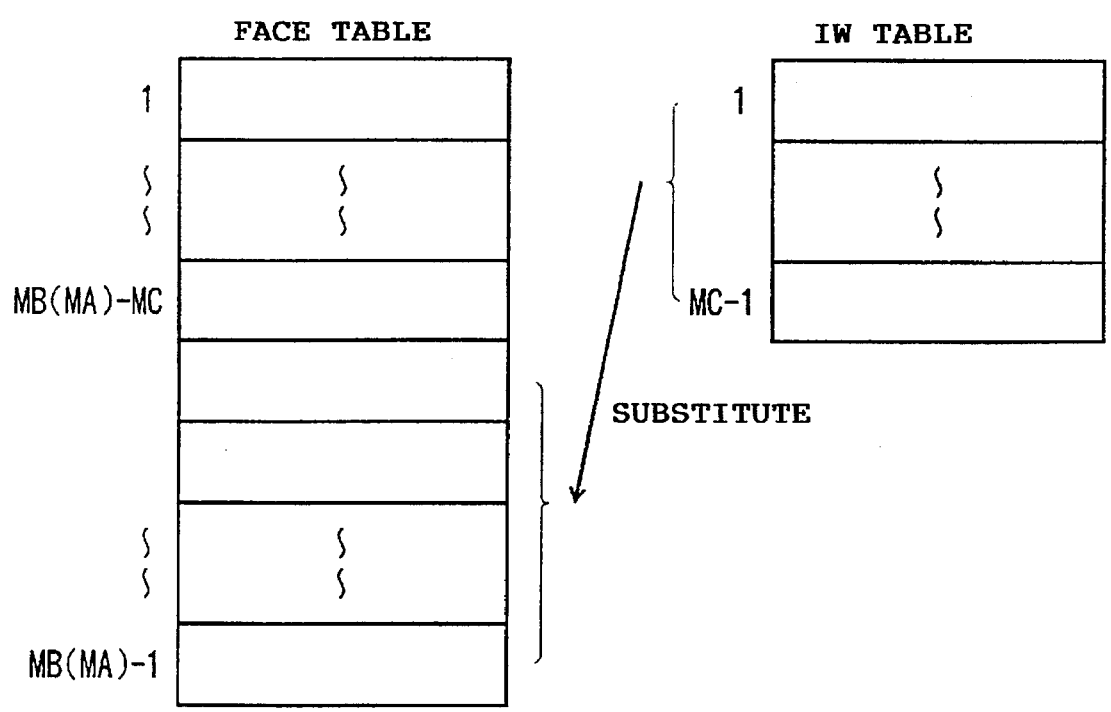
FIG. 46 is a diagram showing a state where data at a part where the boundary surface counter value of the buffer IW is 1~MC−1 are successively substituted into a part where the boundary surface counter value of the face table is 1~MC(MA)−MC+1.

Accordingly, when all of the node numbers of the face of the comparing destination and the node numbers of the face of the comparing source match, the data of the face table at the part where the boundary surface counter value is 1 to MC-1 are first stored in the buffer IW at a part where the boundary surface counter value is 1 to MC-1 as shown in FIG. 44. Then, the data of the face table at the part where the boundary surface counter value is MC+1 to MB(MA) are successively substituted into the part where the boundary surface counter value is 1 to MB(MA)-1 as shown in FIG. 45. In addition, the data of the buffer IW at the part where the boundary surface counter value is 1 to MC-1 are successively substituted into the face table at the part where the boundary surface counter value is 1 to MB(MA)-MC+1 as shown in FIG. 46. Hence, the face of the comparing destination is deleted from the face table, and in addition, the data are rearranged so that the face subsequent to the face which is judged as being the same with another becomes positioned at the start of the face table.

Returning now to the description of FIG. 41, the step S115 escapes from the node comparing loop (step S84) when MC>MB(MA). In other words, when there is no face table which can be read by the face number MA of the comparing destination, the process escapes from the node comparing loop (step S84), and the process advances to a step S116. On the other hand, when the relation MC>MB(MA) does not stand, the process returns to the step S107. The step S116 increments N to N+1. A step S117 escapes from the comparing surface setting loop (step S83) when N>6. In other words, when the face table is read in its entirety and there is no face number of the comparing destination to be read, it may be judged that no identical faces exist, and thus, the face of the comparing source is stored in the face table. On the other hand, when the relation N>6 does not stand, the process returns to the step S104 shown in FIG. 40.

A step S118 increments MB(M) to MB(M)+1. A step S119 stores the read face in the face table. A step S120 increments L to L+1. A step S121 escapes from the node obtaining loop (step S82) when L>IE. In addition, a step S122 increments KB to KB+1. A step S123 escapes from the identical face retrieval loop (step S81) when KB>LB. In other words, when there is no face to be read with respect to 1 element which is read and L>IE, a face which newly becomes the comparing source is read and the above described process is carried out until all of the elements are read. The process returns to the step S102 when all of the elements are not read. On the other hand, when the relation L>IE does not stand, the process returns to the step S104.

Next, a description will be given of an eighth embodiment of the process which detects the boundary surface, by referring to FIGS. 47 through 49.

Figure 47:
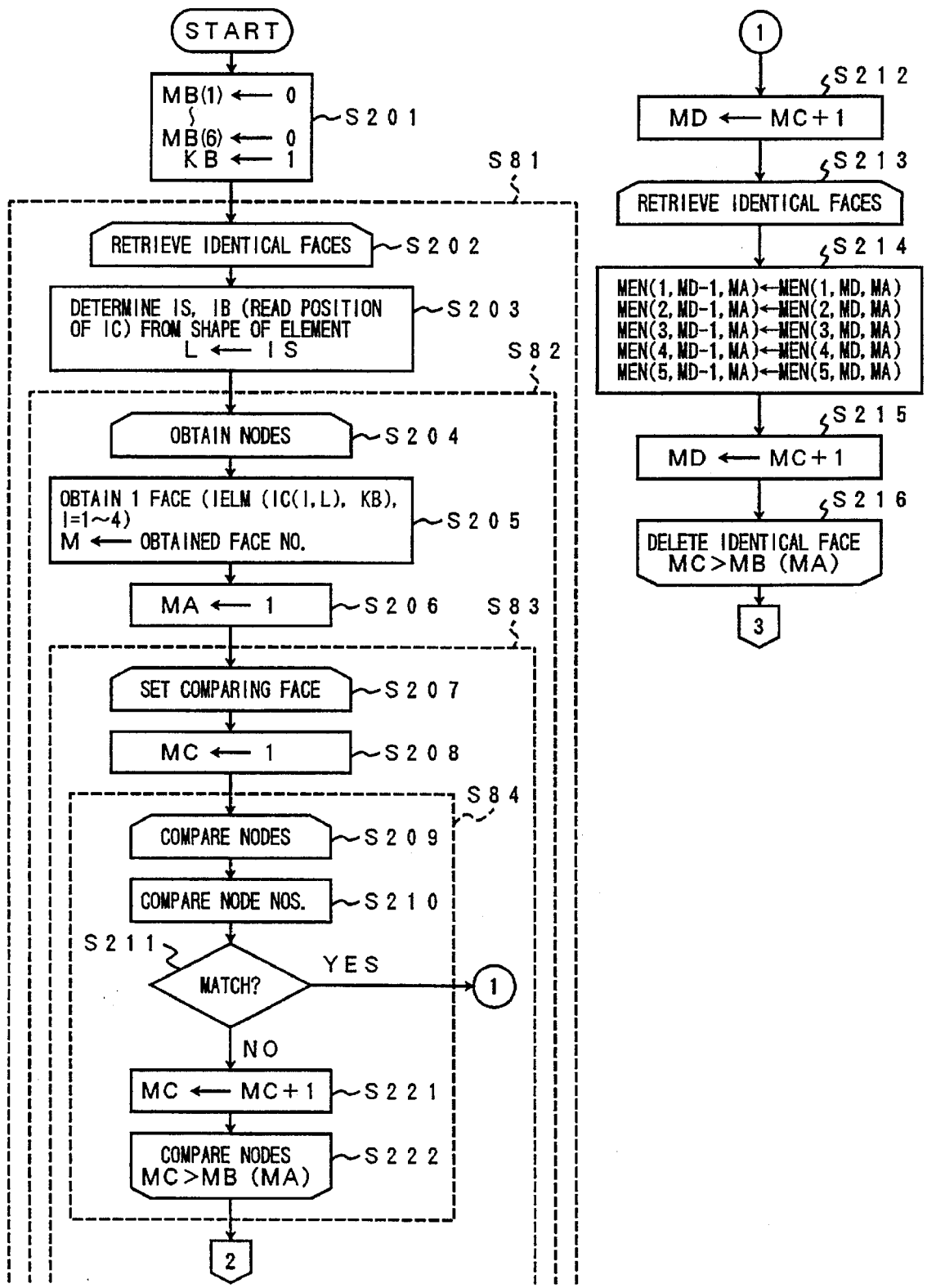
FIGS. 47 and 48 respectively are flow charts for explaining an eighth embodiment of the process which detects the boundary surface.
Figure 48:
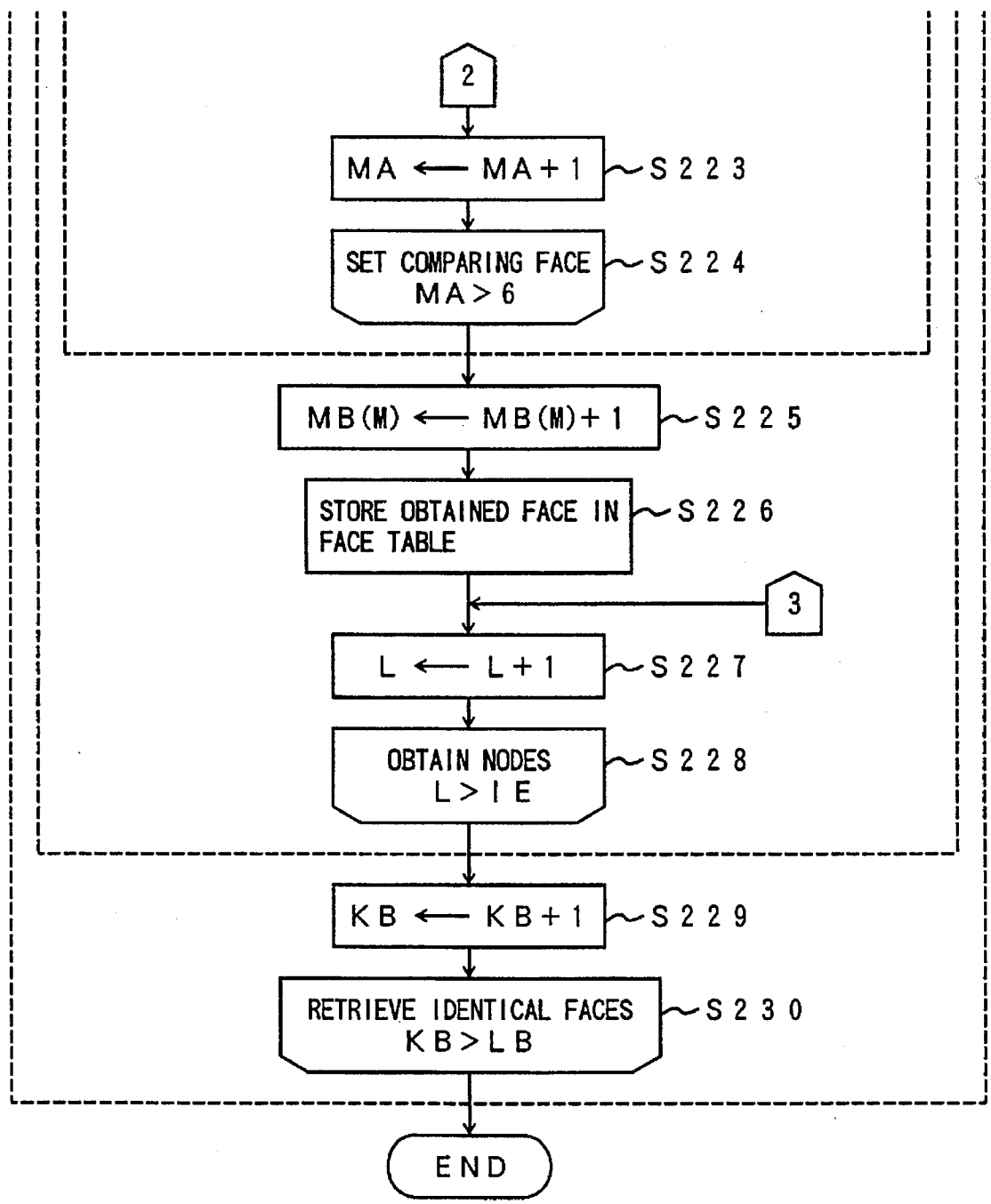
Figure 49:
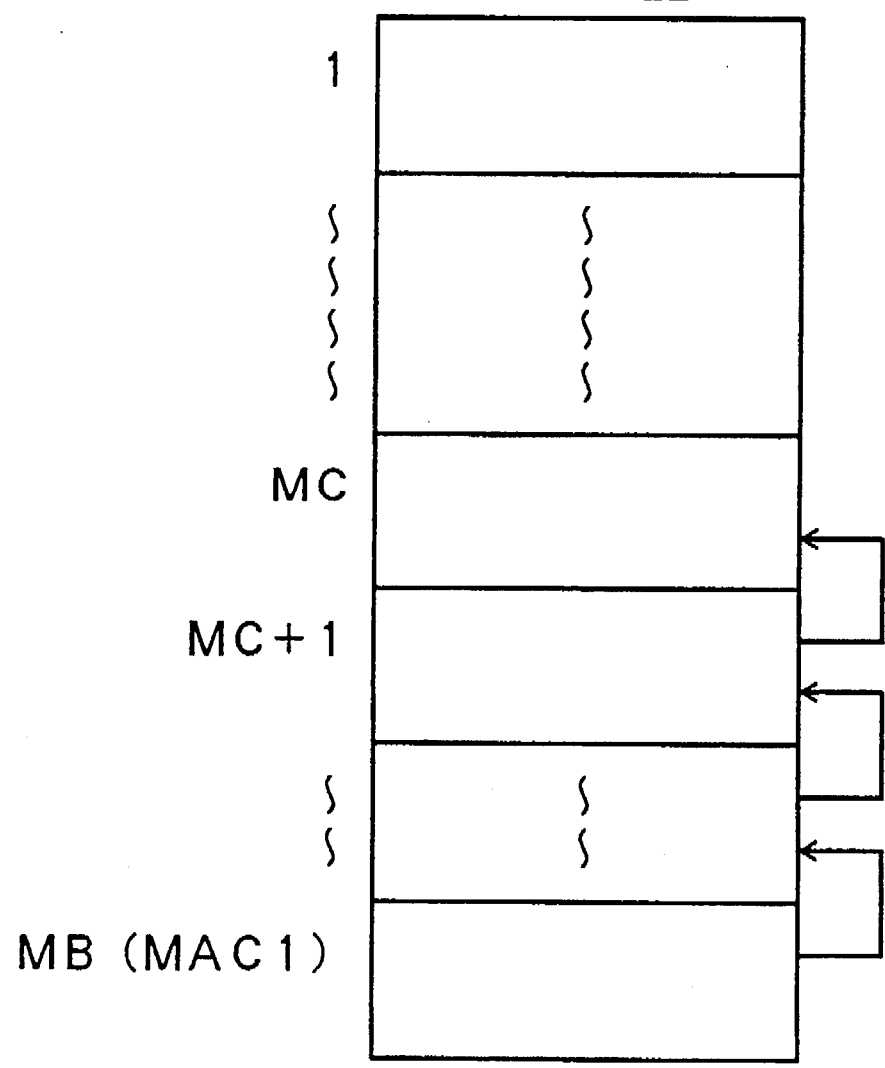
FIG. 49 is a diagram showing a stage where data at a part where the boundary surface counter value of the face table is MC+1~MB(MA) are shifted by one and successively stored at a part where the boundary surface counter value of the face table is MC~MB(MA)−1.

FIGS. 47 and 48 are flow charts for explaining the eight embodiment of the process which detects the boundary surface. This embodiment utilizes the fact that the face numbers are assigned in the same direction among the adjacent elements of the analyzing model which is used for the finite element method analysis. Hence, by checking the face numbers of the other elements according to a predetermined rule instead of starting from the face number 1, it becomes possible to detect the boundary elements at a high speed.

This embodiment also uses the two-dimensional array IELM(14,KB) shown in FIG. 33 as the region for storing the elements. In addition, the three-dimensional array MEN(5, MC,6) shown in FIG. 34 is used as the region for storing the boundaries. Furthermore, the one-dimensional array MB(6) shown in FIG. 35 is used as the region for storing the boundary face numbers. The two-dimensional array IC(4,L) shown in FIG. 36 is used to specify the node to be read from the two-dimensional array IELM.

In addition, the retrieval sequence of the nodes forming the elements is as described above in conjunction with FIG. 37, and the element forming sequence is as described above in conjunction with FIG. 38. The two-dimensional array MAC(6,6) which is used to set the face number to be compared depending on the obtained face number is as described above in conjunction with FIG. 39.

In FIG. 47, a step S201 sets initial values. More particularly, MB(1) through MB(6) are set to 0, and KB is set to 1.

A step S202 starts an identical face retrieval loop (step S81) which retrieves the identical faces of the analyzing model from the three-dimensional array MEN(5,MC,6), for example. A step S203 judges the shape of the element from the two-dimensional array IELM(3,KB), and determines a suffix (IS,IE) of the two-dimensional array IC(4,L) which specifies the position of the node number from which the reading is to start from the two-dimensional array IELM(3, KB). As described above, the two-dimensional array IC(4,L) prestores data indicating the positions of the node numbers to be read with respect to each of the face numbers 1 to 6 depending on the shape of the element.

A step S204 starts a node obtaining loop (step S82) which obtains the nodes from the two-dimensional array IELM(3, KB). A step S205 reads 1 face (IELM(IC(I,L),KB),(I=1~4)), and defines the face number of the 1 face which is read as the face number M of the face of the comparing source. In addition, a step S206 sets the face number MA of the comparing source to 1.

A step S207 starts a comparing face setting loop (step S83) which sets the face of the comparing destination from the two-dimensional array MAC(N,M) based on the face number M. Hence, the face number MA of the comparing destination is determined to 1, 2, . . . , 6 in this sequence from the two-dimensional array MAC(N,M) based on the face number M read in the step S205, and the faces of the comparing destination are obtained from the face table. A step S208 sets MC to 1.

A step S209 starts a node comparing loop (step S84) which compares the node numbers of the face of the comparing source obtained in the step S205 and the node numbers of the face of the comparing destination obtained in the step S207. A step S210 compares the node numbers of the face of the comparing source and the node numbers of the face of the comparing destination. A step S211 decides whether or not all of the compared node numbers match. If the decision result in the step S211 is YES, a step S212 sets MD to MC+1, and deletes the face of the comparing destination from the face table by carrying out a matching process which is made up of steps S213 through S216.

The step S213 starts a process which deletes the identical face. A step S214 stores the three-dimensional array MEN (1,MD,MA) to the three-dimensional array MN(1,MD−1, MA), the data of the three-dimensional array MEN(2,MD, MA) to the three-dimensional array MN(2,MD−1,MA), the data of the three-dimensional array MEN(3,MD,MA) to the three-dimensional array MN(3,MD−1,MA), the data of the three-dimensional array MEN(4,MD,MA) to the three-dimensional array MN(4,MD−1,MA), and the data of the three-dimensional array MEN(5,MD,MA) to the three-dimensional array MN(5,MD−1,MA). A step S215 increments MD to MD+1. A step ends the process which deletes the identical face when MD>MB(MA), and the process advances to a step S227 shown in FIG. 45 which will be described later.

Accordingly, when the node numbers of the face of the comparing destination and the node numbers of the face of the comparing source all match, the data of the face table at a part where the boundary surface counter value is MC+1 to MB(MA) are shifted one by one and are successively stored in the face table at a part where the boundary surface counter value is MC to MB(MA)−1. As a result, the face of the comparing destination is deleted from the face table.

On the other hand, if the decision result in the step S211 is NO, a step S221 increments MC to MC+1, and a step S222 escapes from the node comparing loop (step S84) when MC>MB(MA). In other words, when there is no face table which can be read by the face number MA of the comparing destination, the process escapes from the node comparing loop (step S84), and the process advances to a step S223 shown in FIG. 45. On the other hand, when the relation MC>MB(MA) does not stand, the process returns to the step S207. The step S223 increments MA to MA+1. A step S224 escapes from the comparing surface setting loop (step S83) when MA>6. In other words, when the face table is read in its entirety and there is no face number of the comparing destination to be read, it may be judged that no identical faces exist, and thus, the face of the comparing source is stored in the face table. On the other hand, when the relation MA>6 does not stand, the process returns to the step S204 shown in FIG. 47.

A step S225 increments MB(M) to MB(M)+1. A step S226 stores the read face in the face table. A step S227 increments L to L+1. A step S228 escapes from the node obtaining loop (step S82) when L>IE. In addition, a step S229 increments KB to KB+1. A step S230 escapes from the identical face retrieval loop (step S81) when KB>LB. In other words, when there is no face to be read with respect to 1 element which is read and L>IE, a face which newly becomes the comparing source is read and the above described process is carried out until all of the elements are read. The process returns to the step S202 when all of the elements are not read. On the other hand, when the relation L>IE does not stand, the process returns to the step S204.

Next, a description will be given particularly of the process which distinguishes the inside and the outside of the target unit from the group of faces which do not make contact with the faces of other elements in the steps ST5 and ST6 and the process of filling the finite elements in the space surrounded by the internal surfaces of the target unit in the embodiment shown in FIG. 2, by referring to FIGS. 50 through 52.

Figure 50:
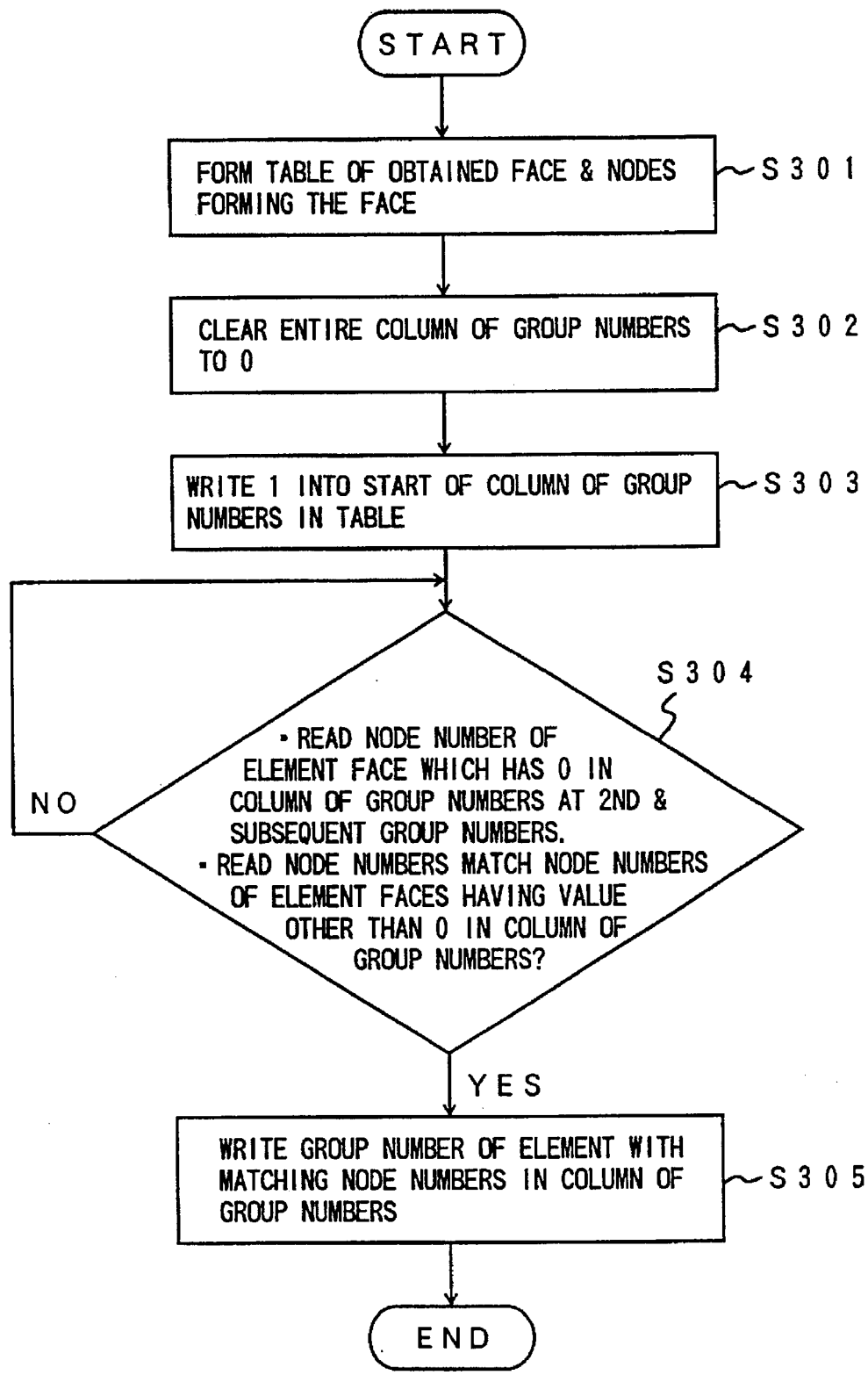
FIG. 50 is a flow chart for explaining a process which checks connecting surfaces from the node sharing relationship of the faces and divides the connecting surfaces into face groups.

FIG. 50 is a flow chart for explaining the process which checks the connecting surfaces from the node sharing relationship of the faces and dividing the connecting faces into face groups. In FIG. 50, a step S301 forms a table shown in FIG. 51 from the read faces and the nodes forming the read faces. In FIG. 51, each element is identified by an element ID, and the face number, each node number and group number are stored with respect to each of the elements. The group number is a number which is assigned wit respect to each face group for the sake of convenience.

A step S302 clears the entire column of the group numbers in the table shown in FIG. 51 to 0. A step S303 stores 1 in the column of the group numbers at the starting (or first) group number in the table shown in FIG. 51. A step S304 reads the node numbers of the element face which has 0 in the column of the group numbers at the second and subsequent group numbers, and decides whether or not the read node numbers match the node numbers of the element faces having a value other than 0 in the column of the group numbers. If the decision result in the step S304 is YES, a step S305 stores in the column of the group numbers the group number of the element face formed by the nodes having the node numbers which match the read node numbers.

Figure 52:
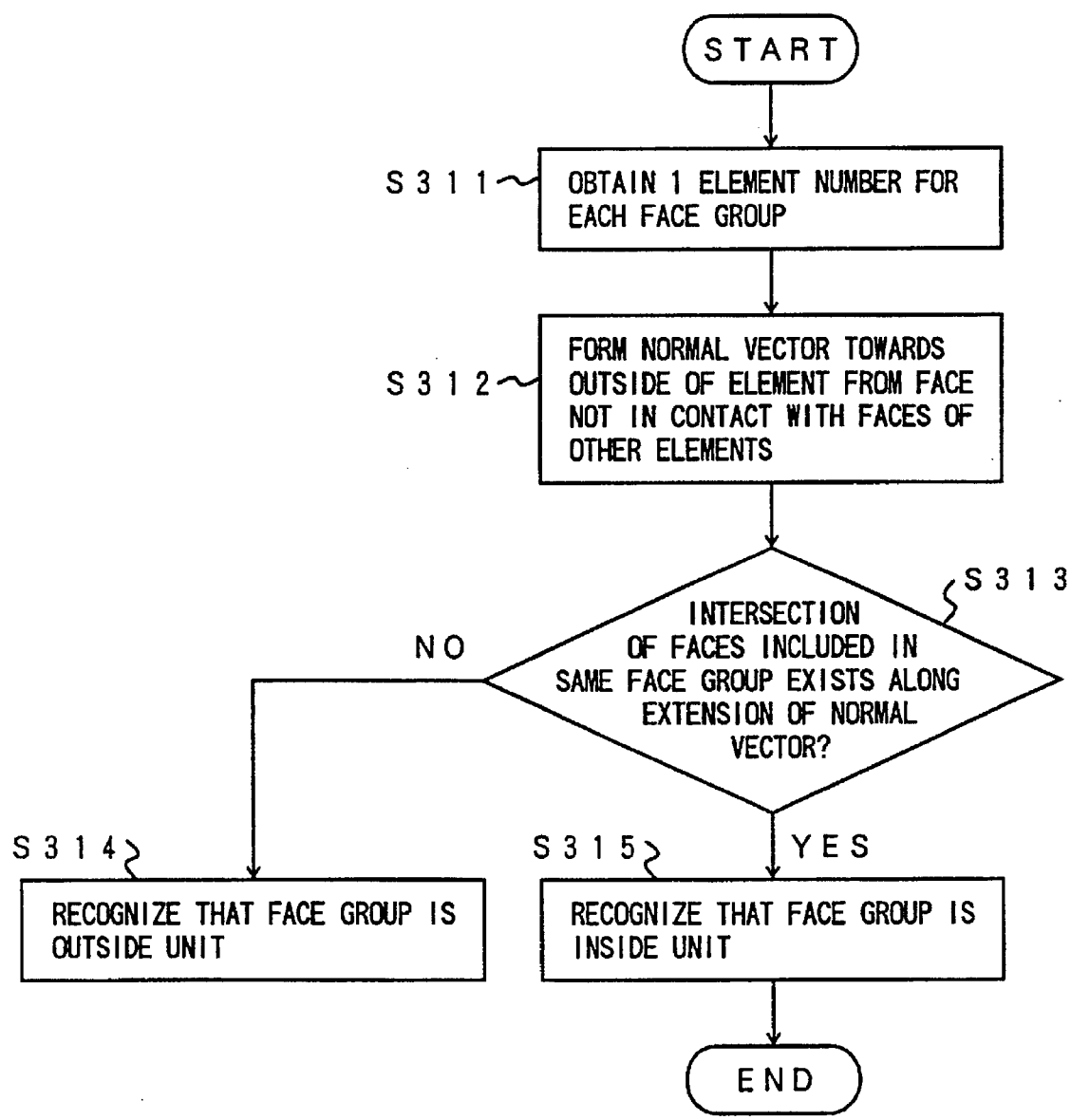
FIG. 52 is a flow chart for explaining a process which distinguishes inside and outside of a shape of a target unit.

FIG. 52 is a flow chart for explaining the process which distinguishes the inside and the outside of the shape of the target unit. In FIG. 52, a step S311 reads 1 element number for each face group which is to be processed. A step S312 forms a normal vector towards the outside of the element from the face which does not make contact with the faces of other elements, out of the faces of the element having the read element number. A step S313 decides whether or not an intersection of the faces included in the same face group exists along the extension of the normal vector by carrying out a calculation. If the decision result in the step S313 is NO, a step S314 recognizes that the face group which is the target of the processing forms the outside of the target unit. On the other hand, if the decision result in the step S313 is YES, a step S315 recognizes that the face group which is the target of the processing forms the inside of the target unit.

Figure 53:
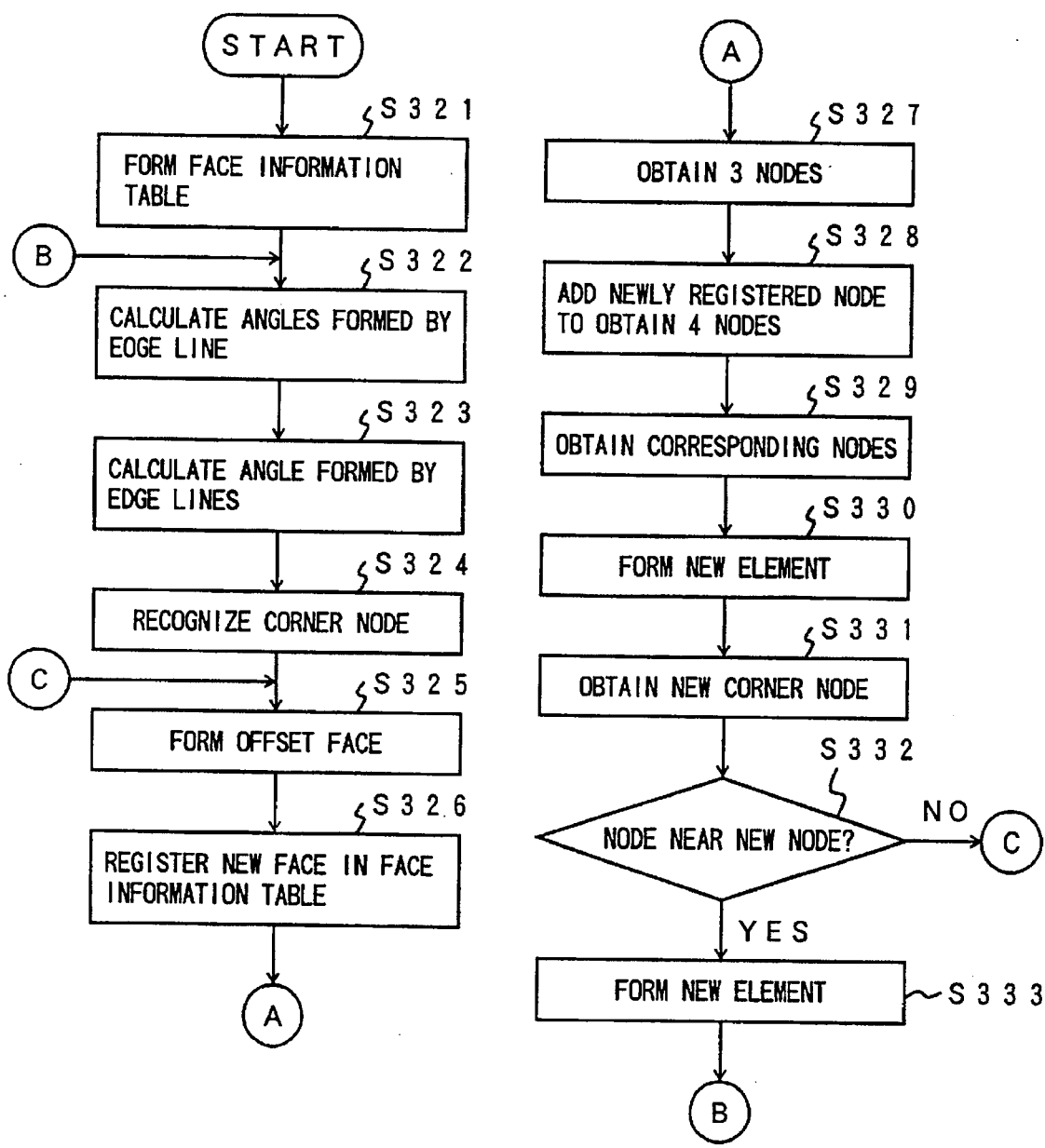
FIG. 53 is a flow chart for explaining a process which fills finite elements in a space surrounded by inner surfaces of the target unit.
Figure 54:
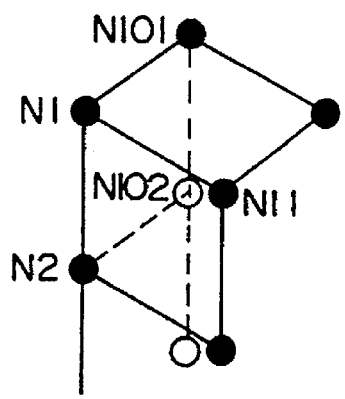
FIG. 54 is a perspective view showing a face group which is to be processed.

FIG. 53 is a flow chart for explaining the process which fills the finite elements in the space which is surrounded by the internal surfaces of the target unit. In FIG. 43, a step S321 forms a face information table related to adjacent nodes (hereinafter referred to as connecting nodes) which connect to the nodes which form the face group which is the target of the processing, for each of the nodes forming the face group. A step S322 reads 1 node from the face information table, and calculates angles formed by edge (or ridge) lines from the read node to the connecting nodes. For example, when the face group shown in FIG. 54 is the target of the processing, the angles formed by the edge lines from a node N1 to each of connecting nodes N2, N11e and N1O1 are calculated when the node N1 is read from the face information table.

A step S323 obtains the edge lines one by one, and calculates the angle formed by each edge line and each of the other edge lines. In the case shown in FIG. 54, the step S323 calculates the angle formed the edge line which is formed between the nodes N2 and N11 via the node N1 and the edge line which is formed between the nodes N2 and N101 via the node N1. In this case, a 90° angle is formed by the edge line and each of the other edge lines.

When a plurality of pairs of edge lines form an angle which is within a predetermined angle, a step S324 recognizes that a node which is sandwiched between the connecting nodes is a corner node. In the case shown in FIG. 54, the angle formed by a pair of edge lines sandwiching the node N1 and another pair of edge lines also sandwiching the node N1 are both 90°, and thus, the node N1 is recognized as the corner node.

A step S325 obtains 3 nodes of an arbitrary face out of the nodes forming the 3 faces which have the corner node, and forms a face which is offset to another node in a direction opposite to the normal vector of the face which is formed by these 3 nodes. The step S325 carries out such an operation for each of the 3 faces. In a case shown in FIG. 55, the face which is formed by the nodes N1, N2, N12 and N11 is offset to a position of the node N101.

A step S326 registers the 3 new faces which are obtained by the offset into the face information table, and calculates an intersection of the 3 new faces obtained by the offset. The step S326 also registers the calculated intersection as a new node. In this particular case shown in FIG. 58, an intersection N112 is registered as the new node.

A step S327 obtains 3 nodes in a direction opposite to the normal vector of an arbitrary existing face. For example, in the case shown in FIG. 55, the 3 nodes N101, N102 and N111 in the direction opposite to the normal vector of the existing face which is formed by the nodes N1, N2, N12 and N11 are obtained. In addition, a step S328 obtains 4 nodes by adding the new node which is registered in the step S326 to the 3 nodes obtained in the step S327. For example, in the case shown in FIG. 55, the new node N112 is added to the nodes N101, N102 and N111, and the 4 nodes N101, N102, N11 and N112 are obtained.

Figure 55:
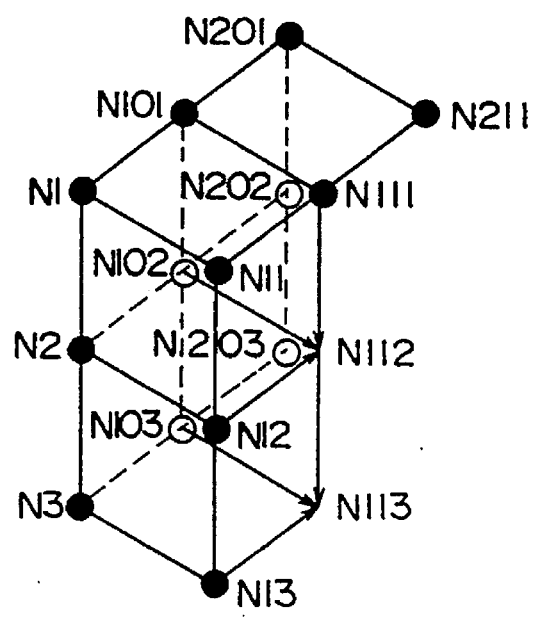
FIG. 55 is a perspective view showing a face group which is to be processed.

A step S329 checks the corresponding relationship of the nodes forming the existing face obtained in the step S327 and the 4 nodes obtained in the step S328, and recognizes as corresponding nodes the nodes which are closest to the nodes forming the existing face in a direction opposite to the normal vector of the existing face obtained in the step S327 For example, in the case shown in FIG. 55, the corresponding relationship of the nodes N1, N2, N12 and N11 forming the existing face and the 4 nodes N101, N102, N111 and N112 is checked, and the nodes N101, N102, N112 and N111 which are closest to the nodes N1, N2, N12 and N11 are recognized as the corresponding nodes.

A step S330 forms a new element from the existing face and the corresponding nodes. In other words, in the case shown in FIG. 55, a new element is formed from the existing face formed by the nodes N1, N2, N12 and N11 and the corresponding nodes N101, N102, N112 and N111, that is, from the nodes N1, N11, N12, N2, N101, N111, N112 and N102.

A step S331 obtains an arbitrary node which links to the corner node which is obtained, and recognizes this arbitrary node as a new corner node. A step S332 decides whether or not an existing node exists in a vicinity of the newly formed corner node. If the decision result in the step S332 is NO, the process returns to the step S325. On the other hand, if the decision result in the step S332 is YES, a step S333 forms a new element using the existing node, and the process thereafter returns to the step S322 so as to carry out the process of finding a new corner node.

Further, the present invention is not limited to these embodiments, but various variations and modifications may be made without departing from the scope of the present invention.

What is claimed is:

1. A method of forming an analyzing model for use in finite element method analysis, said method comprising the steps of:

(a) detecting faces of elements of the analyzing model which do not make contact with faces of other elements, based on information related to the analyzing model which is used in the finite element method analysis and describes a target unit which is to be analyzed;

(b) grouping the faces of the elements detected in said step (a) into first groups for each of face numbers which are assigned with respect to each of the faces;

(c) out of the elements having the faces included in each of the first groups obtained in said step (b), extracting elements having element numbers with the same increase number and grouping the extracted elements in second groups, where the element numbers are assigned with respect to each of the elements;

(d) storing storage information with respect to the elements included in each of the second groups obtained in said step (c), where said storage information includes an element initial number, an element final number, an element number increase value and a face number included in the element;

(e) specifying a range of the faces formed by the elements extracted in said step (c) with respect to said storage information;

(f) newly forming solid finite elements in a space which is formed by the faces in the range specified by said step (e);

(g) forming information which defines boundary conditions at faces outside the range specified by said step (e); and (h) changing conditions values depending on position coordinates of the faces in the definition of said boundary conditions of the faces.

2. The method as claimed in claim 1, wherein said steps (e) and (f) distinguish whether each face included in a group of faces which do not make contact with faces of other elements is inside or outside of a shape of the target unit, and newly fills finite elements in a space surrounded by faces on the inside of the shape of the target unit.

3. The method as claimed in claim 2, wherein said step (f) fills the space inside the shape of the target unit with finite elements having properties other than those of the target unit.

4. The method as claimed in claim 2, wherein said step (g) forms bulk data for defining at least one boundary condition out of thermal conduction surface, initial temperature condition, final temperature condition, restricting condition and pressure condition by specifying a range of at least one of coordinate space, element number and node number with respect to the face outside the shape of the target unit out of the group of faces which do not make contact with the faces of other elements.

5. The method as claimed in claim 4, wherein said step (g) detects a face which does not make contact with the faces of other elements and makes contact with the space for each of the extracted elements, and inputs analyzing conditions such as heat radiation to the detected surface so as to form information which defines the thermal conduction surface at the face outside the range which is specified by said step (e).

6. The method as claimed in claim 5, wherein said step (h) changes condition values depending on positions of the faces with respect to analyzing conditions to faces making contact with the space.

7. The method as claimed in claim 6, wherein said step (h) changes thermal conductivity depending on position coordinates of the faces when defining the thermal conduction surface.

8. The method as claimed in claim 1, wherein, when the analyzing model has a three-dimensional shape having a form of an n-story building which is built up from a two-dimensional drawing according to a predetermined rule, said step (a) detects boundary elements by checking only (K—1)th and (K+1)th floors without checking all of the elements when a checking target has K floors, by using a characteristic in which node numbers, element numbers and face numbers increase in the same direction among mutually adjacent elements.

9. The method as claimed in claim 1, wherein, when the analyzing mode is formed according to a predetermined rule, said step (a) detects boundary elements by limiting target elements to be checked to within a predetermined range of dummy intermediate node numbers by obtaining a range of the node numbers and generating the dummy intermediate node numbers intermediate this range.

10. The method as claimed in claim 1, wherein said step (a) detects boundary elements by specifying elements to be checked using a sum total of the node numbers when the analyzing model is formed according to a predetermined rule.

11. The method as claimed in claim 1, wherein said step (a) stores maximum values and minimum values of the coordinate values of the node numbers, and detects boundary elements by specifying elements to be checked based on the maximum values and minimum values.

12. The method as claimed in claim 1, wherein said step (a) detects boundary elements by specifying elements to be checked using coordinate values of nodes stored at a start of a table which stores the node numbers of the nodes forming the elements.

13. The method as claimed in claim 1, wherein said step (a) forms a X-axis coordinate value table, a Y-axis coordinate value table and a Z-axis coordinate value table which respectively store starting nodes out of the nodes forming each of the elements in a rearranged sequence starting from smallest coordinate values together with the element numbers using the coordinate values of the nodes stored at a start of a table which stores the node numbers of the nodes forming the elements, and detects boundary elements by specifying elements to be checked using the X-axis coordinate value table, the Y-axis coordinate value table and the Z-axis coordinate value table.

14. The method as claimed in claim 1, wherein said step (a) detects boundary elements by checking face numbers of other elements according to a predetermined rule and not from a face number 1, by using a characteristic in which the face numbers of the analyzing model are assigned in the same direction among mutually adjacent elements.

15. An apparatus which forms an analyzing model for use in finite element method analysis, said apparatus comprising:

first means for detecting faces of elements of the analyzing model which do not make contact with faces of other elements, based on information related to the analyzing model which is used in the finite element method analysis and describes a target unit which is to be analyzed;

second means for grouping the faces of the elements detected in said first means into first groups for each of face numbers which are assigned with respect to each of the faces;

third means for extracting elements having element numbers with the same increase number and grouping the extracted elements in second groups, out of the elements having the faces included in each of the first groups obtained in said second means, where the element numbers are assigned with respect to each of the elements;

fourth means for storing storage information with respect to the elements included in each of the second groups obtained in said third means, where said storage information includes an element initial number, an element final number, an element number increase value and a face number included in the element;

fifth means for specifying a range of the faces formed by the elements extracted in said third means with respect to said storage information;

sixth means for newly forming solid finite elements in a space which is formed by the faces in the range specified by said fifth means;

seventh means for forming information which defines boundary conditions at faces outside the range specified by said fifth means; and eighth means for changing conditions values depending on position coordinates of the faces in the definition of said boundary conditions of the faces.

16. The apparatus as claimed in claim 15, wherein said fifth and sixth means distinguish whether each face included in a group of faces which do not make contact with faces of other elements is inside or outside of a shape of the target unit, and newly fills finite elements in a space surrounded by faces on the inside of the shape of the target unit.

17. The apparatus as claimed in claim 16, wherein said sixth means fills the space inside the shape of the target unit with finite elements having properties other than those of the target unit.

18. The apparatus as claimed in claim 16, wherein said seventh means forms bulk data for defining at least one boundary condition out of thermal conduction surface, initial temperature condition, final temperature condition, restricting condition and pressure condition by specifying a range of at least one of coordinate space, element number and node number with respect to the face outside the shape of the target unit out of the group of faces which do not make contact with the faces of other elements.

19. The apparatus as claimed in claim 18, wherein said seventh means detects a face which does not make contact with the faces of other elements and makes contact with the space for each of the extracted elements, and inputs analyzing conditions such as heat radiation to the detected surface so as to form information which defines the thermal conduction surface at the face outside the range which is specified by said fifth means.

20. The apparatus as claimed in claim 19, wherein said eighth means changes condition values depending on positions of the faces with respect to analyzing conditions to faces making contact with the space.

21. The apparatus as claimed in claim 20, wherein said eighth means changes thermal conductivity depending on position coordinates of the faces when defining the thermal conduction surface.

22. The apparatus as claimed in claim 15, wherein, when the analyzing model has a three-dimensional shape having a form of an n-story building which is built up from a two-dimensional drawing according to a predetermined rule, said first means detects boundary elements by checking only (K−1)th and (K+1)th floors without checking all of the elements when a checking target has K floors, by using a characteristic in which node numbers, element numbers and face numbers increase in the same direction among mutually adjacent elements.

23. The apparatus as claimed in claim 15, wherein, when the analyzing mode is formed according to a predetermined rule, said first means detects boundary elements by limiting target elements to be checked to within a predetermined range of dummy intermediate node numbers by obtaining a range of the node numbers and generating the dummy intermediate node numbers intermediate this range.

24. The apparatus as claimed in claim 15, wherein said first means detects boundary elements by specifying elements to be checked using a sum total of the node numbers when the analyzing model is formed according to a predetermined rule.

25. The apparatus as claimed in claim 15, wherein said first means stores maximum values and minimum values of the coordinate values of the node numbers, and detects boundary elements by specifying elements to be checked based on the maximum values and minimum values.

26. The apparatus as claimed in claim 15, wherein said first means detects boundary elements by specifying elements to be checked using coordinate values of nodes stored at a start of a table which stores the node numbers of the nodes forming the elements.

27. The apparatus as claimed in claim 15, wherein said first means forms a X-axis coordinate value table, a Y-axis coordinate value table and a Z-axis coordinate value table which respectively store starting nodes out of the nodes forming each of the elements in a rearranged sequence starting from smallest coordinate values together with the element numbers using the coordinate values of the nodes stored at a start of a table which stores the node numbers of the nodes forming the elements, and detects boundary elements by specifying elements to be checked using the X-axis coordinate value table, the Y-axis coordinate value table and the Z-axis coordinate value table.

28. The apparatus as claimed in claim 15, wherein said first means detects boundary elements by checking face numbers of other elements according to a predetermined rule and not from a face number 1, by using a characteristic in which the face numbers of the analyzing model are assigned in the same direction among mutually adjacent elements.

* * * * *

UNITED STATES PATENT AND TRADEMARK OFFICE
CERTIFICATE OF CORRECTION

PATENT NO. : 5,671,167
DATED : September 23, 1997
INVENTOR(S) : ITO et al.

It is certified that error appears in the above-identified patent and that said Letters Patent is hereby corrected as shown below:

Col. 4, line 8, change "operating on" to --operation--.

Col. 5, line 3, change "s" to --is--;
line 26, change "1-MC" to --1-MB--.

Col. 8, line 30, change "S8" to --S6--.

Col. 13, line 38, change "8" to --6--;
line 40, change "S83" to --S63--.

Col. 15, line 53, change "38" to --36--;
line 56, change "38" to --36--.

Col. 21, line 53, change "N11e" to --N11--.

Col. 22, line 16, change "58" to --55--.

Signed and Sealed this

Tenth Day of February, 1998

*Attest:*

BRUCE LEHMAN

*Attesting Officer*  *Commissioner of Patents and Trademarks*